(12) United States Patent
Ford

(10) Patent No.: US 9,188,120 B2
(45) Date of Patent: Nov. 17, 2015

(54) CYCLONIC DEBRIS EVACUATION APPARATUS AND METHOD FOR A PUMP

(71) Applicant: Michael Brent Ford, St. George, UT (US)

(72) Inventor: Michael Brent Ford, St. George, UT (US)

( * ) Notice: Subject to any disclaimer, the term of this patent is extended or adjusted under 35 U.S.C. 154(b) by 330 days.

(21) Appl. No.: 13/757,277

(22) Filed: Feb. 1, 2013

(65) Prior Publication Data

US 2014/0219828 A1 Aug. 7, 2014

Related U.S. Application Data

(60) Division of application No. 12/902,804, filed on Oct. 12, 2010, now Pat. No. 8,561,813, which is a continuation-in-part of application No. 12/785,028, filed on May 21, 2010, now Pat. No. 8,505,747.

(60) Provisional application No. 61/180,676, filed on May 22, 2009.

(51) Int. Cl.
| | |
|---|---|
| *E21B 37/00* | (2006.01) |
| *F04B 53/00* | (2006.01) |
| *E21B 12/06* | (2006.01) |
| *B01D 17/02* | (2006.01) |
| *E21B 43/38* | (2006.01) |
| *F04B 47/00* | (2006.01) |

(52) U.S. Cl.
CPC ............ *F04B 53/00* (2013.01); *B01D 17/0217* (2013.01); *E21B 12/06* (2013.01); *E21B 37/00* (2013.01); *E21B 43/38* (2013.01); *F04B 47/005* (2013.01)

(58) Field of Classification Search
CPC .................................. E21B 12/06; E21B 37/00
USPC ............ 417/555.1, 555.2, 430; 166/369, 265, 166/105.2
See application file for complete search history.

(56) References Cited

U.S. PATENT DOCUMENTS

| | | | | |
|---|---|---|---|---|
| 5,314,018 | A  * | 5/1994 | Cobb | 166/265 |
| 7,008,197 | B2 * | 3/2006 | Ford | 417/430 |
| 7,404,702 | B2 * | 7/2008 | Ford | 417/430 |
| 7,713,035 | B2 * | 5/2010 | Ford | 417/430 |
| 2006/0083646 | A1 * | 4/2006 | Ford | 417/555.1 |
| 2011/0024370 | A1 * | 2/2011 | Ford | 210/787 |

* cited by examiner

*Primary Examiner* — Nathan J Newhouse
*Assistant Examiner* — Christopher Bobish
(74) *Attorney, Agent, or Firm* — Weiss & Moy, P.C.; Veronica-Adele R. Cao

(57) ABSTRACT

A method for removing a buildup of solid impurities on a barrel using a cyclonic debris evacuation assembly, the method comprising: capturing solid impurities between a cup component of said cyclonic debris evacuation assembly and the barrel in a groove positioned below the cup component; directing the solid impurities in the groove into at least one port; and flushing away the solid impurities.

5 Claims, 21 Drawing Sheets

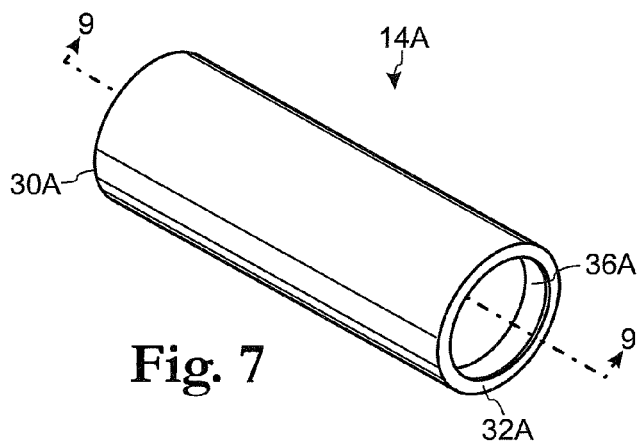
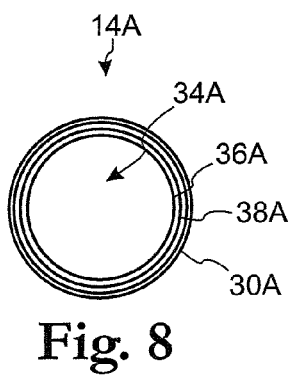
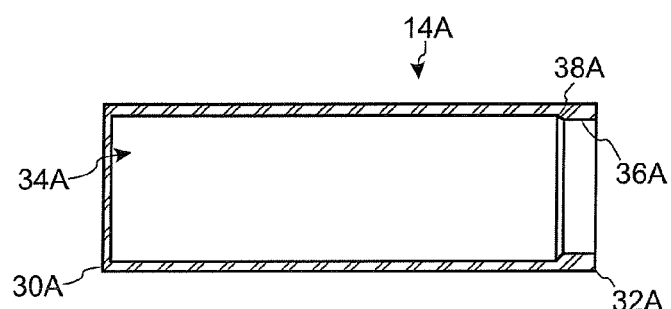
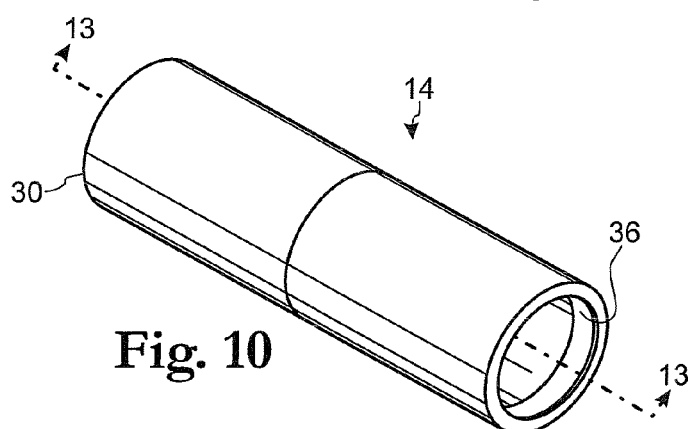
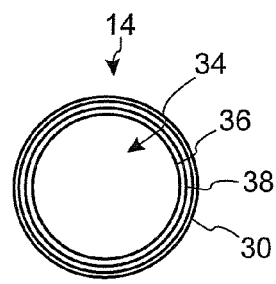
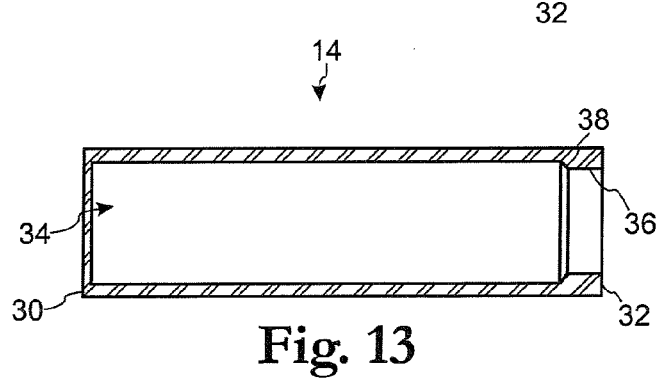
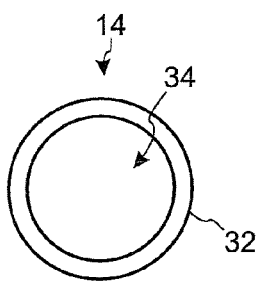

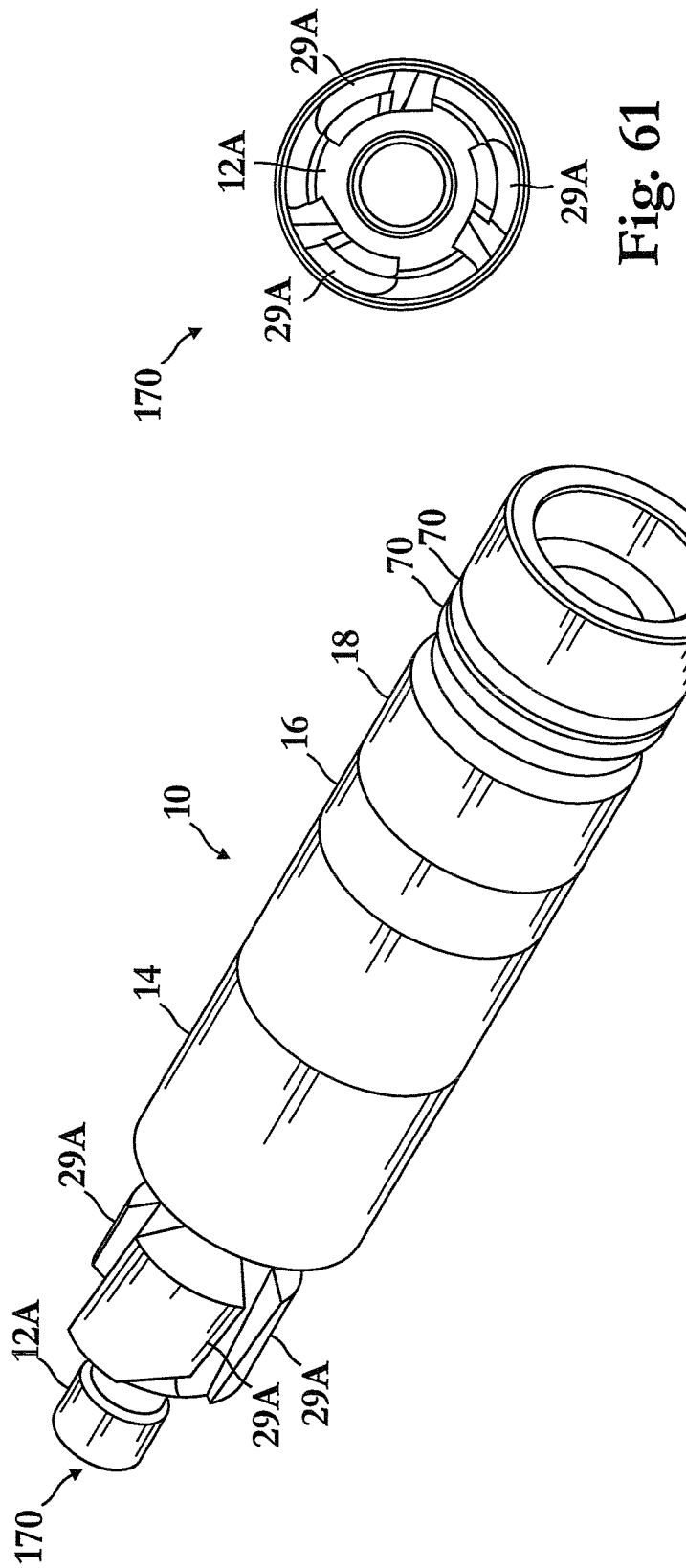

CYCLONIC DEBRIS EVACUATION APPARATUS AND METHOD FOR A PUMP

RELATED APPLICATION

This application is a divisional of and claims priority to U.S. application Ser. No. 12/902,804, titled CYCLONIC DEBRIS EVACUATION APPARATUS AND METHOD FOR A PUMP filed Oct. 12, 2010 by Michael Brent Ford which is a continuation-in-part of U.S. application Ser. No. 12/785,028 titled CYCLONIC DEBRIS EVACUATION APPARATUS AND METHOD FOR A PUMP filed May 21, 2010 by Michael Brent Ford that claimed priority to U.S. Provisional Application Ser. No. 61/180,676 titled CYCLONIC DEBRIS EVACUATION APPARATUS AND METHOD FOR A PUMP and filed on May 22, 2009 by Michael Ford, all of which are hereby incorporated by reference in their entirety.

TECHNICAL FIELD

The present application generally relates to fluid pumping apparatuses and systems and, more particularly, to a cyclonic debris evacuation apparatus and method that is intended to extend plunger and barrel life.

BACKGROUND

Oil well pumping systems are well known in the art. Such systems can be used to mechanically remove oil or other fluid from beneath the earth's surface, particularly when the natural pressure in an oil well has diminished. Generally, an oil well pumping system begins with an above-ground pumping unit, which can commonly be referred to as a "pumpjack," "nodding donkey," "horsehead pump," "beam pump," "sucker rod pump," and the like. The pumping unit can create a reciprocating up and down pumping action that moves the oil, or other substance being pumped, out of the ground and into a flow line, from which the oil is then taken to a storage tank or other such structure.

Below the ground, a shaft is lined with piping known as "tubing." Into the tubing is inserted a string of sucker rods, which ultimately is indirectly coupled at its north end to the above-ground pumping unit. The string of sucker rods is ultimately indirectly coupled at its south end to a subsurface or "down-hole" pump that is located at or near the fluid in the oil well. The subsurface pump can have a number of basic components, including a barrel and a plunger. The plunger can operate within the barrel, and the barrel, in turn, is positioned within the tubing. It is common for the barrel to include a standing valve and the plunger to include a traveling valve. The standing valve can have a ball therein, the purpose of which is to regulate the passage of oil from down-hole into the pump, allowing the pumped matter to be moved northward out of the system and into the flow line, while preventing the pumped matter from dropping back southward into the hole. Oil can be permitted to pass through the standing valve and into the pump by the movement of the ball off its seat, and oil is prevented from dropping back into the hole by the seating of the ball. North of the standing valve, coupled to the sucker rods, can be the traveling valve. The traveling valve can regulate the passage of oil from within the pump northward in the direction of the flow line, while preventing the pumped oil from dropping back southward, in the direction of the standing valve and hole.

Actual movement of the pumped substance through the system will now be discussed. Oil is typically pumped from a hole through a series of downstrokes and upstrokes of the pump, which motion is imparted by the above-ground pumping unit. During the upstroke, formation pressure causes the ball in the standing valve to move upward, allowing the oil to pass through the standing valve and into the barrel of the oil pump. This oil can be held in place between the standing valve and the traveling valve. In the traveling valve, the ball is located in the seated position, held there by the pressure from the oil that has been previously pumped.

On the downstroke, the ball in the traveling valve unseats, permitting the oil that has passed through the standing valve to pass there through. Also during the downstroke, the ball in the standing valve seats, prevents pumped oil from moving back down into the hole. The process repeats itself again and again, with oil essentially being moved in stages from the hole, to above the standing valve and in the oil pump, to above the traveling valve and out of the oil pump. As the oil pump fills, the oil passes through the pump and into the tubing. As the tubing is filled, the oil passes into the flow line, and is then taken to the storage tank or other such structure.

There are a number of problems that are regularly encountered during fluid pumping operations. Fluid that is pumped from the ground is generally impure, and includes solid impurities such as sand, pebbles, limestone, grit, iron sulfide, and other sediment and debris. Certain kinds of pumped fluids, such as heavy crude, tend to contain a relatively large amount of solids.

Solid impurities can be harmful to a fluid pumping apparatus and its components for a number of reasons. For example, sand, pebbles, limestone, grit, iron sulfide, and other sediment and debris can become trapped between pump components, causing damage and excessive wear, reducing effectiveness, and sometimes requiring a halt to pumping operations and replacement of the damaged components. These solid impurities frequently collect and become concentrated between the barrel and plunger. In particular, as the amount of space or clearance between the exterior surface of the plunger and the interior surface of the barrel in typical pump plungers and barrels can be as great as 0.01", this permits a constant passage of fluid, including solid impurities, between the plunger exterior and the barrel interior. During fluid pumping operations, particularly when the pump plunger reciprocates, the collection of solid impurities causes rapid wear to the pump components. Thus, the solid impurities that are contained within the fluid and that pass through the space between the plunger and the barrel score the plunger and barrel surfaces, thereby reducing the operating life of both. In addition, frictional forces generated by the collections of solid impurities can cause excessive stress to be generated throughout the pump and sucker rod string, which often results in sticking of the pump, automatic shut-down of the pumping unit, or a parted sucker rod string.

One prior art solution has been the use of plunger units having large accumulation areas into which the solid impurities can be collected. The accumulation areas in such plunger units are typically approximately 3-5 feet long and are composed of metal. However, such units must be replaced in their entirety when they sustain wear. In general, repairs to or replacement of pump components that become necessary by virtue of the aforementioned damage caused by solid impurities can be time-consuming and expensive.

The present application addresses these problems encountered in prior art pumping systems and provides other, related advantages.

SUMMARY

In accordance with one embodiment of the present application, a cyclonic debris evacuation apparatus is provided.

The cyclonic debris evacuation apparatus can include a cyclone component having at least one flute. In addition, the cyclonic debris evacuation apparatus can include a cup component fitted over a portion of the cyclone component. The cyclonic debris evacuation apparatus can also include a ring component connected to the cup component fitted over a portion of the cyclone component and having a groove with at least one port. The cyclonic debris evacuation apparatus can include a ring coupler component connected to the ring component and coupled to the cyclone component.

In accordance with another embodiment of the present application, a method for removing a buildup of solid impurities on a barrel using a cyclonic debris evacuation assembly is provided. The method can include capturing solid impurities between a cup component of the cyclonic debris evacuation assembly and the barrel in a groove positioned below the cup component. In addition, the method can include directing the solid impurities in the groove into at least one port. The method can also include flushing away the solid impurities.

In accordance with yet another embodiment of the present application, a debris removal apparatus is provided. The debris removal apparatus can include a hollow valve rod coupler component and a cup component fitted over a portion of the hollow valve rod coupler component. In addition, the debris removal apparatus can include a ring component fitted over a portion of the hollow valve rod coupler component having at least one port. The debris removal apparatus can also include a ring coupler component coupled to the hollow valve rod coupler component. The debris removal apparatus can include a channel that extends through the hollow valve rod coupler component and the ring coupler component and in fluid communication with the at least one port.

BRIEF DESCRIPTION OF THE DRAWINGS

The novel features believed to be characteristic of the application are set forth in the appended claims. In the descriptions that follow, like parts are marked throughout the specification and drawings with the same numerals, respectively. The drawing figures are not necessarily drawn to scale and certain figures can be shown in exaggerated or generalized form in the interest of clarity and conciseness. The application itself, however, as well as a preferred mode of use, further objectives and advantages thereof, will be best understood by reference to the following detailed description of illustrative embodiments when read in conjunction with the accompanying drawings, wherein:

FIG. 7 is a perspective view of an exemplary cup component of the cyclonic debris evacuation apparatus of the present application;

FIG. 8 is a top view of the exemplary cup component of FIG. 7;

FIG. 9 is a cross-sectional view of the exemplary cup component of FIG. 7, taken along line 9-9;

FIG. 10 is a perspective view of an exemplary cup component of the cyclonic debris evacuation apparatus of the present application;

FIG. 11 is a top view of the exemplary cup component of FIG. 10;

FIG. 12 is a bottom view of the exemplary cup component of FIG. 10;

FIG. 13 is a cross-sectional view of the exemplary cup component of FIG. 10, taken along line 13-13;

FIG. 60 is a bottom perspective front view of an exemplary cyclonic debris evacuation apparatus for use with a tubing pump system, consistent with an embodiment of the present application;

FIG. 61 is a top view of the exemplary cyclonic debris evacuation apparatus of FIG. 60;

DETAILED DESCRIPTION

Figure 1:
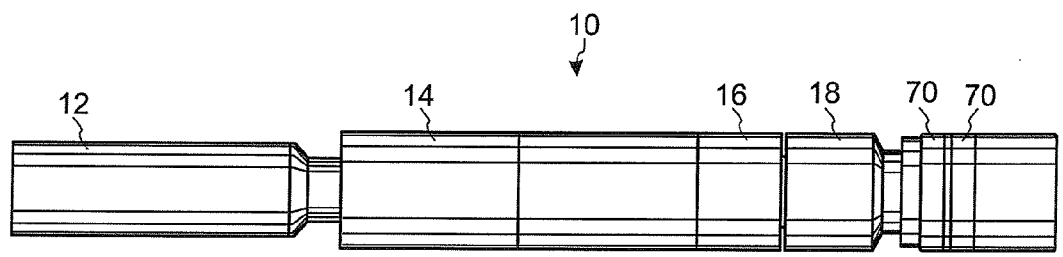
FIG. 1 is a front view of an exemplary cyclonic debris evacuation apparatus, consistent with an embodiment of the present application.

The foregoing description is provided to enable any person skilled in the relevant art to practice the various embodiments described herein. Various modifications to these embodiments will be readily apparent to those skilled in the relevant art, and generic principles defined herein can be applied to other embodiments. Thus, the claims are not intended to be limited to the embodiments shown and described herein, but are to be accorded the full scope consistent with the language of the claims, wherein reference to an element in the singular is not intended to mean "one and only one" unless specifically stated, but rather "one or more." All structural and functional equivalents to the elements of the various embodiments described throughout this disclosure that are known or later come to be known to those of ordinary skill in the relevant art are expressly incorporated herein by reference and intended to be encompassed by the claims. Moreover, nothing disclosed herein is intended to be dedicated to the public regardless of whether such disclosure is explicitly recited in the claims.

The present application generally relates to fluid pumps and associated systems and, more particularly, to a cyclonic debris evacuation apparatus and method that is intended to extend plunger and barrel life. In one illustrative embodiment, a cyclonic debris evacuation apparatus and method for dispersing debris in a pumping system that forms between the plunger exterior and barrel interior is provided. The apparatus can be configured for use with a valve rod and have a cyclone component, cup component, ring component, and ring coupler component. The apparatus can also be configured for use with a hollow valve rod and have a hollow valve rod coupler component, cup component, ring component, and ring coupler component.

The cup component can be composed of a high density poly-fiber material that helps in creating a positive seal between the cup component and barrel interior during pumping operations, helping to direct solids into the cup component and thereby preventing them from travelling southward in the direction of the barrel and causing damage. The cup component can also include a specialized leading edge adapted to direct solids into the cup component. Interior to the cyclonic debris evacuation apparatus, entering debris can become mixed with pumped fluid, and can be drawn out of the pumping system with the pumped fluid. The pumped fluid passing through the cyclonic debris evacuation apparatus can be caused to rotate by a radial design of flutes included on the cyclone component or an angled design of openings included on the hollow valve rod coupler component.

To further prevent solids from traveling down the pump plunger, the cyclonic debris evacuation apparatus can incorporate a groove to assist with removal of the debris. The grove can be tapered to capture solids between the barrel and the cup component of the cyclonic debris evacuation apparatus. With this improvement, the solids are prevented from moving back and forth on the outer diameter of the cup component reducing or eliminating barrel and plunger wear. The groove can divert the solids away from the barrel wall and into a channel cut three hundred and sixty (360) degrees around the shaft of the apparatus. The apparatus can be configured for which three (3) angle ports allow liquid to flow into the interior section of the main body of the apparatus. The solids can be swept away into the flow keeping the cup and barrel and plunger from additional wear.

Typically the cyclonic debris evacuation apparatus can be adapted to each pump design that is currently being utilized in the production of crude oil. In a further illustrative embodiment, the apparatus can incorporate a top plunger adapter for tubing pump designs known to those skilled in the relevant art. The adapter can be coupled to a sucker rod connector. Details of the embodiments of the present application will now be described.

Figure 2:
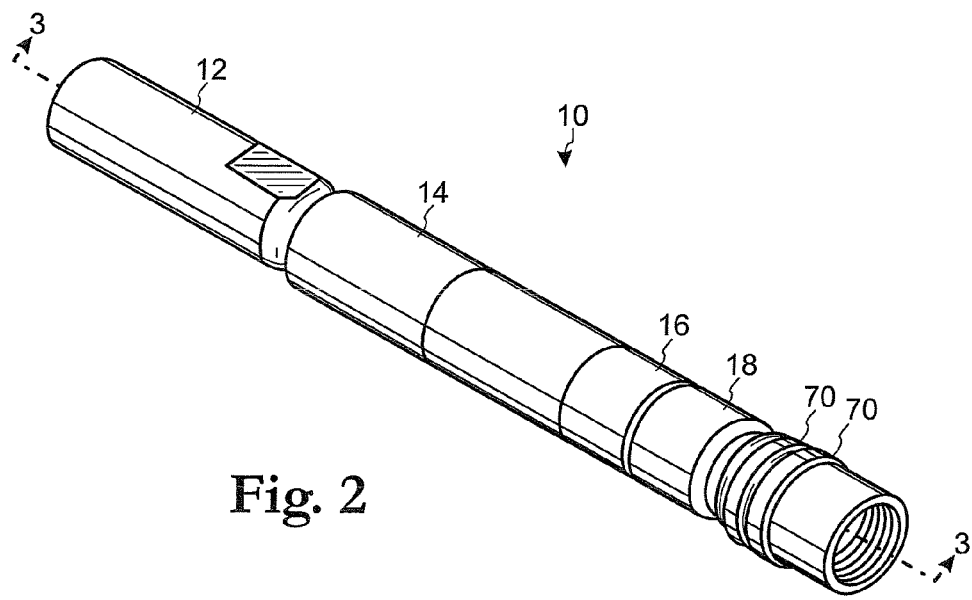
FIG. 2 is a perspective view of the exemplary cyclonic debris evacuation apparatus of FIG. 1.
Figure 3:
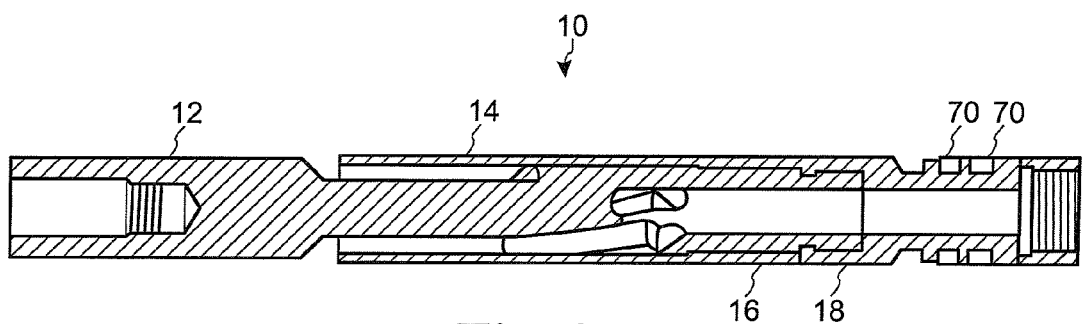
FIG. 3 is a cross-sectional view of the exemplary cyclonic debris evacuation apparatus of FIG. 2, taken along line 3-3.

Referring first to FIGS. 1-3, a cyclonic debris evacuation apparatus 10 consistent with an embodiment of the present application is shown. In describing the structure of the cyclonic debris evacuation apparatus 10 and its operation, the terms "north" and "south" are utilized. The term "north" is intended to refer to that end of the pumping system that is more proximate the pumping unit, while the term "south" is intended to refer to that end of the system that is more distal the pumping unit, or "down hole." In this embodiment, the cyclonic debris evacuation apparatus 10 is configured for use with a pumping system employing a valve rod.

Beginning from the north end, the main components of this embodiment of the cyclonic debris evacuation apparatus 10, which has a substantially cylindrical external configuration, include the following: (a) a cyclone component 12, (b) a cup component 14, (c) a ring component 16, and (d) a ring coupler component 18. The overall length of the cyclonic debris evacuation apparatus 10 can range from approximately one foot to six feet or more. However, it should be clearly understood that substantial benefit could be derived from a cyclonic debris evacuation apparatus 10 having a length that deviates from these dimensions, even substantially, in either direction. For certain embodiments, it can be desired to extend the overall length of the cyclonic debris evacuation apparatus 10 by providing more than one coupler pieces, such as the ring coupler component 18 or the like, which can be adapted to be coupled together end-to-end. The cyclonic debris evacuation apparatus 10 is adapted to be coupled, at a northern-most portion thereof, to a sucker rod or valve rod, and at a southern-most portion thereof, to a pump plunger, as further discussed below.

Figure 4:
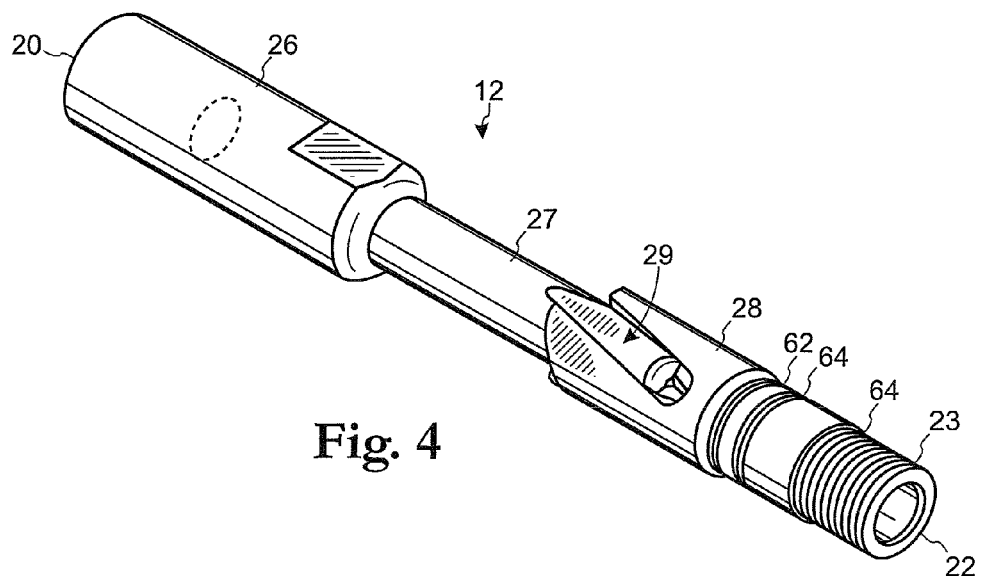
FIG. 4 is a perspective view of an exemplary cyclone component of the cyclonic debris evacuation apparatus of the present application.
Figure 5:
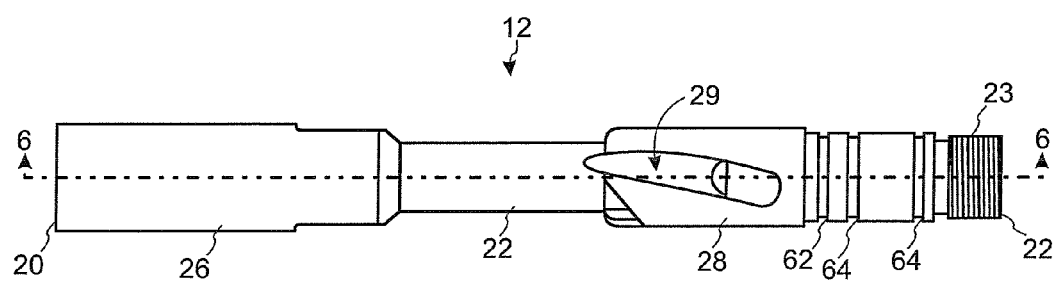
FIG. 5 is a side view of the exemplary cyclone component of FIG. 4.
Figure 6:
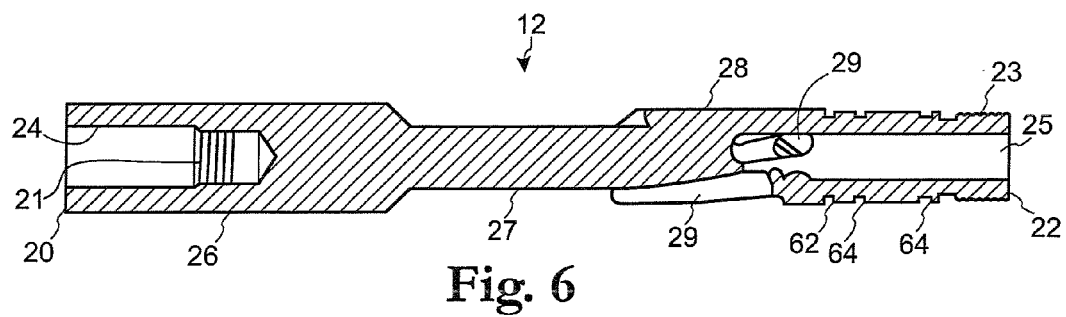
FIG. 6 is a cross-sectional view of the exemplary cyclone component of FIG. 5, taken along line 6-6.
Figure 14:
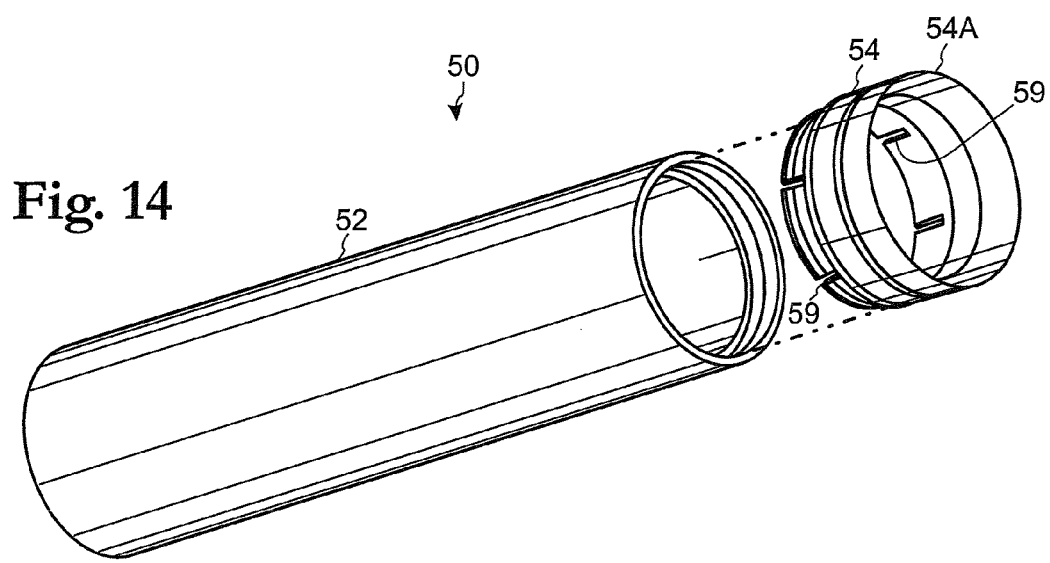
FIG. 14 is an exploded, perspective view of an exemplary cup component of the cyclonic debris evacuation apparatus of the present application.

Referring to FIGS. 4-6, the cyclone component 12 will be described. In this embodiment, the cyclone component 12 is a one-piece structure comprising a substantially elongated member having a north end 20, south end 22, head 26, neck 27, and body 28 having a plurality of flutes 29. An opening 24 in the cyclone component 12 proximate its north end 20 is adapted to receive a southern portion of a sucker rod or valve rod. Threading 21 is included in this embodiment for purposes of coupling the cyclone component 12 to the sucker rod or valve rod. In this embodiment, the threading 21 is positioned at a southern portion of the opening 24, with a northern portion of opening 24 being unthreaded. The unthreaded area of opening 24 acts as an additional support area for a valve rod. The neck 27, in this embodiment, has an overall outer diameter that is slightly less than the outer diameter of the head 26. The neck 27 extends from a southern portion of the head 26 to a northern portion of the body 28. South of the neck 27 is the body 28, which includes the plurality of flutes 29. In this embodiment, three flutes 29 are included in the body 28. However, it can be desired to configure a cyclone component 12 having more than three or less than three flutes 29. In one embodiment, the flutes 29 are radial. In this way, the flutes 29 assist in facilitating the rotation of fluid with solids during pumping operations and enable the solids to be suspended in an orbital rotation for a longer duration during pumping operations, compared with prior art pumping systems. The flutes 29, as seen in this embodiment, extend on an angle from a southern to a northern portion of the body 28. The flutes 29 are open so that fluids and solids can pass there through during pumping operations, eventually continuing northward through the pump barrel. The flutes 29 are substantially elongated, but can be configured in other ways, as desired. Preferably, the flutes taper inwardly as they rotate downwardly (southwardly), helping to direct solid impurities toward an interior portion of the flutes 29, and preventing them from rolling outward from the flutes 29 as they move in a downward direction. Solid impurities that do reach a bottom portion of the flutes 29 are held against an outer wall of the flutes 29 as they settle downward. Preferably, a bottom portion of the flutes 29 tapers inwardly, and away from a main horizontal plane of the cyclone component 12, thereby guiding solid impurities into the openings of the flutes 29, allowing them to settle downward in the direction of the pump plunger, and helping to prevent solid impurities from accumulating on the barrel and causing damage to the barrel. In this embodiment, the flutes 29 are spaced equidistant from each other. The flutes 29 communicate with a channel 25 positioned proximate the south end 22 of the cyclone component 12.

Figure 30:
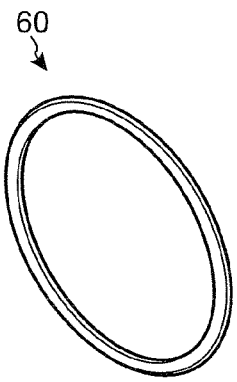
FIG. 30 is a perspective view of an exemplary O-ring device to be utilized with a cyclonic debris evacuation apparatus, consistent with an embodiment of the present application.
Figure 31:
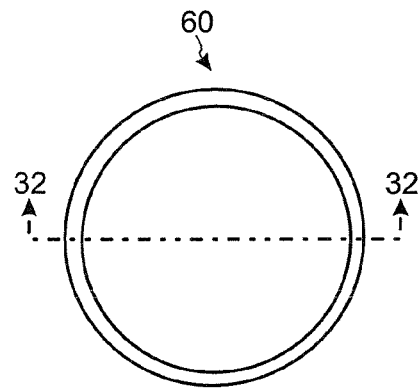
FIG. 31 is a top view of the exemplary O-ring device of FIG. 30.
Figure 32:
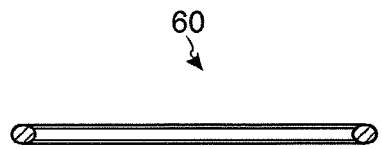
FIG. 32 is a cross-sectional view of the exemplary O-ring device of FIG. 31, taken along line 32-32.

Grooves 62 and 64 are positioned south of the flutes 29 on the cyclone component 12. In this embodiment, one groove 62 and two grooves 64 are utilized, but it should be noted that it would be possible to vary the number of grooves 62 and 64, as desired. Grooves 62 and 64 are each adapted to receive an O-ring device 60 (as shown in FIGS. 30-32). An O-ring device 60 positioned in groove 62 can be useful for helping to secure and align the cup component 14 in position over the cyclone component 12. An O-ring device 60 (or devices 60) positioned in grooves 64 can be useful for helping to secure and align the ring component 16 in position over the cyclone component 12.

Preferably, the south end 22 of the cyclone component includes a threaded region 23, such that the cyclone component 12 can be coupled to the ring coupler component 18, as further discussed below.

The cyclone component 12 is preferably adapted to be fitted in the cup component 14, as further discussed below. In this embodiment, when the cyclone component 12 is positioned in the cup component 14, the head 26 and a portion of the neck 27 protrude from a northern portion of the cup component 14, while threaded region 23 is exposed below a southern portion of the cup component 14. In a preferred embodiment, when an O-ring device 60 is positioned in groove 62, the cup component 14 can be pushed into position over the cyclone component 12. The O-ring device 60 can help to align the cup component 14 over the cyclone component 12, so that the cyclone component 12 is substantially centered within the cup component 14. In another embodiment, the cyclone component 12 can include threading north of its south end 22, such that the cyclone component 12 can be coupled to the cup component 14, as further discussed below. Preferably, the cyclone component 12 is composed of a hardened material, such as carbide, an alloy or some other suitable material.

Referring now to FIGS. 44-47, another embodiment of a cyclone component, hereinafter "cyclone component 12A," is shown. The cyclone component 12A can be used as an alternative to the cyclone component 12 and is somewhat similar to the cyclone component 12, but includes an additional feature of a head 26A having a plurality of flutes 29B. This feature helps in strengthening the cyclone component 12A. In this embodiment, the cyclone component 12A is a one-piece structure comprising a substantially elongated member having a north end 20A, south end 22A, head 26A, neck 27A, and body 28A having a plurality of flutes 29A. An opening 24A (shown in FIG. 46) in the cyclone component 12A proximate its north end 20A is adapted to receive a southern portion of a sucker rod or valve rod. Threading 21A (shown in FIG. 46) is included in this embodiment for purposes of coupling the cyclone component 12A to the sucker rod or valve rod. In this embodiment, the threading 21A is positioned at a southern portion of the opening 24A, with a northern portion of opening 24A being unthreaded. The unthreaded area of opening 24A acts an additional support area for a valve rod.

In this embodiment, the head 26A includes three flutes 29B. However, it can be desired to configure a cyclone component 12A having more than three or less than three flutes 29B. As shown in this embodiment, the head 26A and plurality of flutes 29B extend north of threading 21A. In one embodiment, the flutes 29B are radial. In this way, the flutes 293 assist in facilitating the rotation of fluid with solids during pumping operations and enable the solids to be suspended in an orbital rotation for a longer duration during pumping operations, compared with prior art pumping systems. The flutes 29B, as seen in this embodiment, extend on an angle from a southern portion to a northern portion of the head 26A. The flutes 29B are open so that fluids and solids can pass there through during pumping operations, eventually continuing northward through the pump barrel. The flutes 29B are substantially elongated, but can be configured in other ways, as desired. Preferably, the flutes 29B taper inwardly as they rotate downwardly (southwardly), helping to direct solid impurities toward an interior portion of the flutes 29B, and preventing them from rolling outward from the flutes 29B as they move in a downward direction. Solid impurities that do reach a bottom portion of the flutes 29B are held against an outer wall of the flutes 29B as they settle downward. Preferably, a bottom portion of the flutes 29B tapers inwardly, and away from a main horizontal plane of the cyclone component 12A, thereby guiding solid impurities into the openings of the flutes 29B, allowing them to settle downward in the direction of the pump plunger, and helping to prevent solid impurities from accumulating on the barrel and causing damage to the barrel. Overall, the design of the flutes 29B helps in directing solid impurities toward a central interior portion of the cyclone component 12A, thereby helping to direct such solid impurities away from a leading edge of the cup component 14, 14A, or 50, as referred to below. This helps to prevent premature failure of the cup component 14, 14A, or 50 by preventing solid impurities from filling the cup component 14, 14A or 50 prematurely. In this embodiment, the flutes 29B are spaced equidistant from each other.

The neck 27A, in this embodiment, has an overall outer diameter that is slightly less than the outer diameter of the head 26A. The neck 27A extends from a southern portion of the head 26A to a northern portion of the body 28A. South of the neck 27A is the body 28A, which includes the plurality of flutes 29A. In this embodiment, three flutes 29A are included in the body 28A. However, it can be desired to configure a cyclone component 12A having more than three or less than three flutes 29A. In one embodiment, the flutes 29A are radial. In this way, the flutes 29A assist in facilitating the rotation of fluid with solids during pumping operations and enable the solids to be suspended in an orbital rotation for a longer duration during pumping operations, compared with prior art pumping systems. The flutes 29A, as seen in this embodiment, extend on an angle from a southern to a northern portion of the body 28A. The flutes 29A are open so that fluids and solids can pass there through during pumping operations, eventually continuing northward through the pump barrel. The flutes 29A are substantially elongated, but can be configured in other ways, as desired. Preferably, the flutes 29A taper inwardly as they rotate downwardly (southwardly), helping to direct solid impurities toward an interior portion of the flutes 29A, and preventing them from rolling outward from the flutes 29A as they move in a downward direction. Solid impurities that do reach a bottom portion of the flutes 29A are held against an outer wall of the flutes 29A as they settle downward. Preferably, a bottom portion of the flutes 29A tapers inwardly, and away from a main horizontal plane of the cyclone component 12A, thereby guiding solid impurities into the openings of the flutes 29A, allowing them to settle downward in the direction of the pump plunger, and helping to prevent solid impurities from accumulating on the barrel and causing damage to the barrel. In this embodiment, the flutes 29A are spaced equidistant from each other. The flutes 29A communicate with a channel 25A (shown in FIGS. 46 AND 47) positioned proximate the south end 22A of the cyclone component 12A.

Grooves 62A and 64A are positioned south of the flutes 29A on the cyclone component 12A. In this embodiment, one groove 62A and two grooves 64A are utilized, but it should be noted that it would be possible to vary the number of grooves 62A and 64A, as desired. Grooves 62A and 64A are each adapted to receive an O-ring device 60 (as shown in FIGS. 30-32). An O-ring device 60 positioned in groove 62A can be useful for helping to secure and align the cup component 14 in position over the cyclone component 12A. An O-ring device 60 (or devices 60) positioned in grooves 64 can be useful for helping to secure and align the ring component 16 in position over the cyclone component 12A.

While in this embodiment the south end 22A of the cyclone component 12A is shown without threading, the south end 22A can include a threaded region similar to threaded region 23 of cyclone component 12, such that the cyclone component 12A can be coupled to the ring coupler component 18, as further discussed below.

The cyclone component 12A is preferably adapted to be fitted in the cup component 14, as further discussed below. In a preferred embodiment, when an O-ring device 60 is positioned in groove 62A, the cup component 14 can be pushed into position over the cyclone component 12A. The O-ring device 60 will help to align the cup component 14 over the cyclone component 12A, so that the cyclone component 12A is substantially centered within the cup component 14. In another embodiment, the cyclone component 12A can include threading north of its south end 22A, such that the cyclone component 12A can be coupled to the cup component 14, as further discussed below. Preferably, the cyclone component 12A is composed of a hardened material, such as carbide, an alloy or some other suitable material.

Turning now to FIGS. 10-13, the cup component 14 will be described. The cup component 14 comprises an elongated, substantially tubular member having a north end 30, a south end 32 and a longitudinal channel 34 running there through. The cup component 14 is adapted to receive and fit over a portion of the cyclone component 12 (as seen in FIGS. 1-3). Preferably, the north end 30 of the cup component 14 tapers inward (as shown in FIG. 13, for example), which helps in directing solid impurities into the interior diameter of the cup component 14. In this embodiment, a first segment 36 of the channel 34 proximate the south end 32 has an interior diameter that is less than the interior diameter of the channel 34 overall. In this way, when the cup component 14 is fitted over the cyclone component 12, the cup component 14 can be firmly secured in place. As shown in this embodiment, a second segment 38 of the channel 34 can be angled toward the segment 36, such that a northern-most portion of the segment 38 has an interior diameter corresponding to the interior diameter of the channel 34 overall, while a southern-most portion of the segment 38 has an interior diameter corresponding to the interior diameter of the segment 36. In another embodiment, it can be desired to configure a cup component 14 having a consistent interior diameter from the north end 30 to the south end 32.

In a preferred embodiment, the cup component 14 is comprised of a high density poly-fiber material. The high density poly-fiber material naturally has some flexibility that provides unique advantages. For example, when the pump is on an upstroke, the high density poly-fiber material expands, which permits a positive seal to be created between the cup component and pump barrel. This positive seal helps to prevent solid impurities from sliding between the cup component 14 and pump barrel interior. Further, the high density poly-fiber material of the cup component 14 can grip to an O-ring device 60 positioned in groove 62, thereby helping to securely couple the cup component 14 in place over the cyclone component 12. In this way, the cup component 14 can be "floating" and capable of self-adjusting and becoming substantially centered over the cyclone component 12 and, in turn, substantially centered when positioned at various heights within a pump barrel, as would occur during pumping operations.

In another embodiment, the cup component 14 can include threading that is opposite threading on the cyclone component 12 such that the cup component 14 and cyclone component 12 can be coupled together.

Referring now to FIGS. 7-9, another embodiment of a cup component, hereinafter "cup component 14A," is shown. The cup component 14A is similar to the cup component 14. The cup component 14A comprises an elongated, substantially tubular member having a north end 30A, a south end 32A and a longitudinal channel 34A running there through. The cup component 14A is adapted to receive and fit over a portion of the cyclone component 12. Preferably, the north end 30A of the cup component 14A tapers inward (as shown in FIG. 9, for example), which helps in directing solid impurities into the interior diameter of the cup component 14A. In this embodiment, a first segment 36A of the channel 34A proximate the south end 32A has an interior diameter that is less than the interior diameter of the channel 34A overall. In this way, when the cup component 14A is fitted over the cyclone component 12, the cup component 14A can be firmly secured in place. In particular, an interior portion of the cup component 14A can grip to an O-ring device 60 positioned in groove 62, thereby helping to securely couple the cup component 14A in place over the cyclone component 12. In this way, the cup component 14A can be "floating" and capable of self-adjusting and becoming substantially centered over the cyclone component 12 and, in turn, substantially centered when positioned at various heights within a pump barrel, as would occur during pumping operations.

As shown in this embodiment, a second segment 38A of the channel 34A can be angled toward the segment 36A, such that a northern-most portion of the segment 38A has an interior diameter corresponding to the interior diameter of the channel 34A overall, while a southern-most portion of the segment 38A has an interior diameter corresponding to the interior diameter of the segment 36A. In another embodiment, it can be desired to configure a cup component 14A having a consistent interior diameter from the north end 30A to the south end 32A. Preferably, the cup component 14A is composed of a hardened material, such as carbide, an alloy or some other suitable material.

In another embodiment, the cup component 14A can include threading that is opposite threading on the cyclone component 12 such that the cup component 14A and cyclone component 12 can be coupled together.

Turning now to FIGS. 14-19, a further embodiment of the cup component, hereinafter "cup component 50," is shown.

Figure 17:
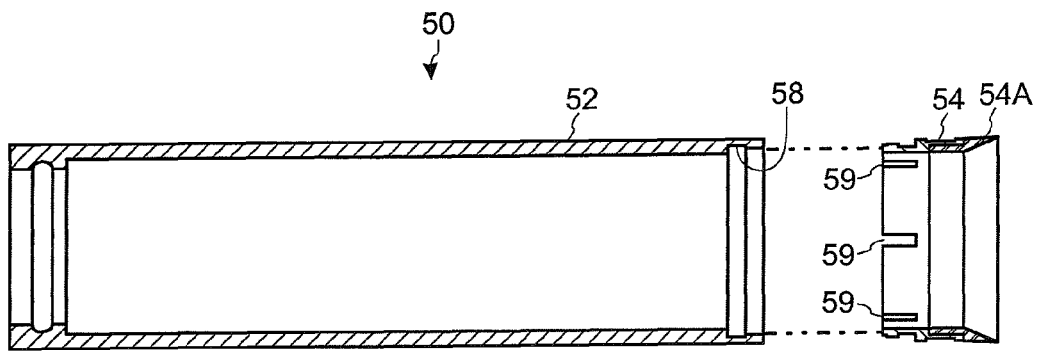
FIG. 17 is an exploded, cross-sectional view of the exemplary cup component of FIG. 14.
Figure 18:
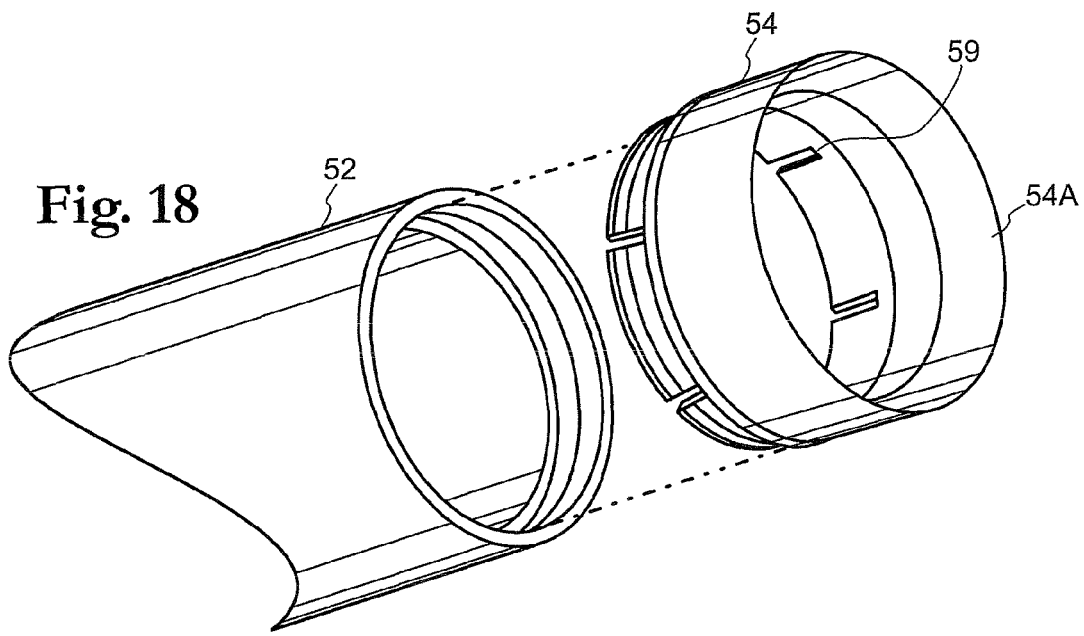
FIG. 18 is a close-up, exploded view of an end portion of the exemplary cup component of FIG. 14.
Figure 19:
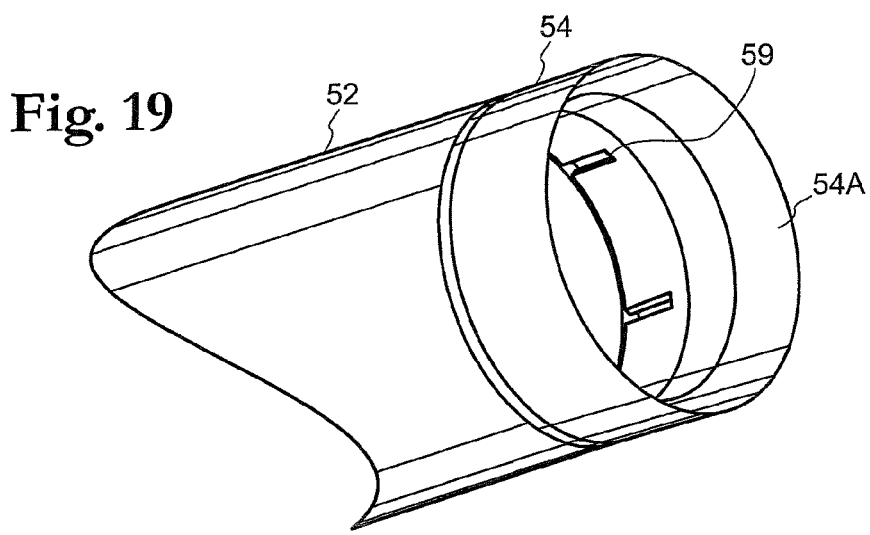
FIG. 19 is a close-up view of an end portion of the exemplary cup component of FIG. 14.

The cup component 50 can be utilized with the cyclonic debris evacuation device 10 as an alternative to the cup component 14 or cup component 14A. As seen in this embodiment, the cup component 50 includes two basic parts: a cup body 52 and a wear region 54. The wear region 54 is adapted to be removably coupled to the cup body 52 to form the cup component 50. In this embodiment, the wear region 54 includes a notched region 56 adapted to correspond to a notched region 58 positioned on the cup body 52, as shown in FIG. 17. In this way, the wear region can be secured to the cup body 52 by inserting the wear region 54 into the cup body 52 and allowing the wear region 54 to snap and lock into place, as indicated by the arrows in FIG. 17. In another embodiment, threading can be provided on the cup body 52 and wear region 54 that would correspond with one another, to permit the wear region 54 to be screwed into place in the cup body 52.

Figure 15:
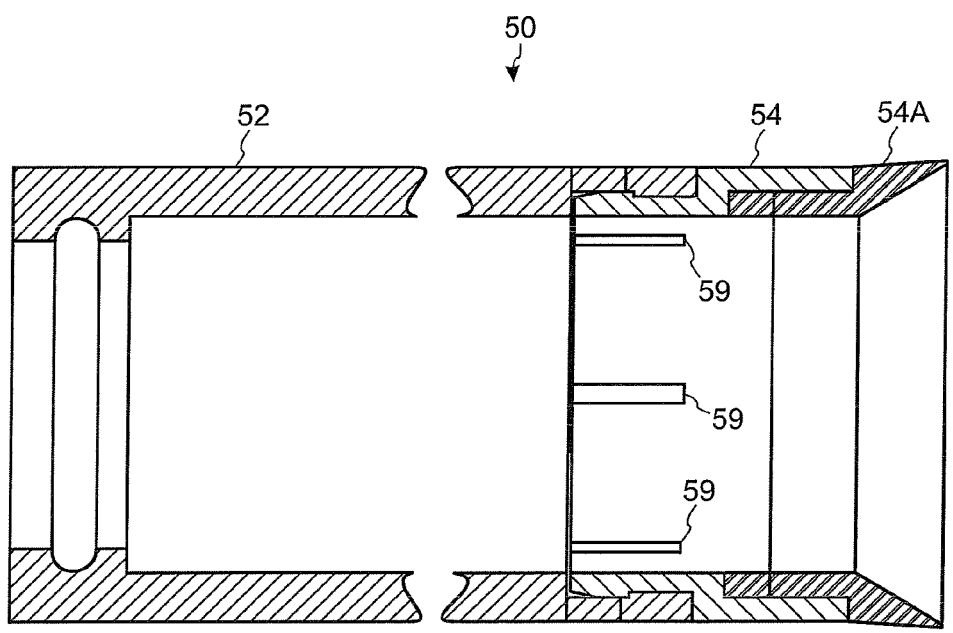
FIG. 15 is a cross-sectional view of end portions of the exemplary cup component of FIG. 14.
Figure 16:
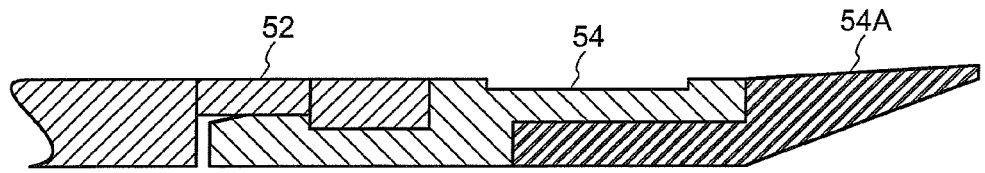
FIG. 16 is a close-up, cross-sectional view of a portion of the exemplary cup component of FIG. 14.

In this embodiment, the wear region 54 includes a leading edge 54A. When the cup component 50 is positioned on the cyclonic debris evacuation apparatus 10, preferably, the leading edge 54A faces northward. In one embodiment, the leading edge 54A tapers inward (as shown in FIGS. 15-17, for example), which helps in directing solid impurities into the interior diameter of the cup component 50. Preferably, the leading edge 54A is composed of a durable elastic or composite type of material. For example, with regard to elastic material, the leading edge 54A can be composed of various rubber compounds, such as neoprene (polychloroprene), nitrile (BUNA-N), urethane, fluoroelastomer (viton), and the like. As another example, with regard to composite material, the leading edge 54A can be composed of various materials, such as poly-fiber, rubber-fiber, carbon-fiber, and the like. Preferably, the material utilized for the leading edge 54A of the wear region 54 would be of a type that is capable of withstanding frictional forces and is abrasive-resistant.

With such an elastic or composite type of material utilized for the leading edge 54A, a positive seal and wear area can be formed between an exterior portion of the leading edge 54A and an interior portion of the pump barrel that will prevent solid impurities from passing southward to the pump plunger and thereby causing damage. While the wear region 54 would eventually need to be replaced at some intervals when the pump unit is repaired, the cup body 52 of the cup component 50 would not need to be replaced as frequently as the wear region 54. The wear region 54 is preferably comprised of a durable elastic or composite material. The wear region 54 can include notches 59, as seen in this embodiment. Notches 59 can help facilitate ease of placement of wear region 54 into the cup body 52. In this embodiment, four notches 59 are shown and are placed equidistant from each other. It can be desired to include more than four or less than four notches 59 on wear region 54.

With regard to the cup body 52, it can be composed of a metal or some type of composite material, such as poly-fiber, rubber-fiber, carbon-fiber, and the like. An advantage to employing composite material is that it allows for more flexibility and a tighter seal as compared to metal. In this regard, a high density poly-fiber material, for example, naturally has some flexibility that provides unique advantages, as discussed above.

Figure 48:
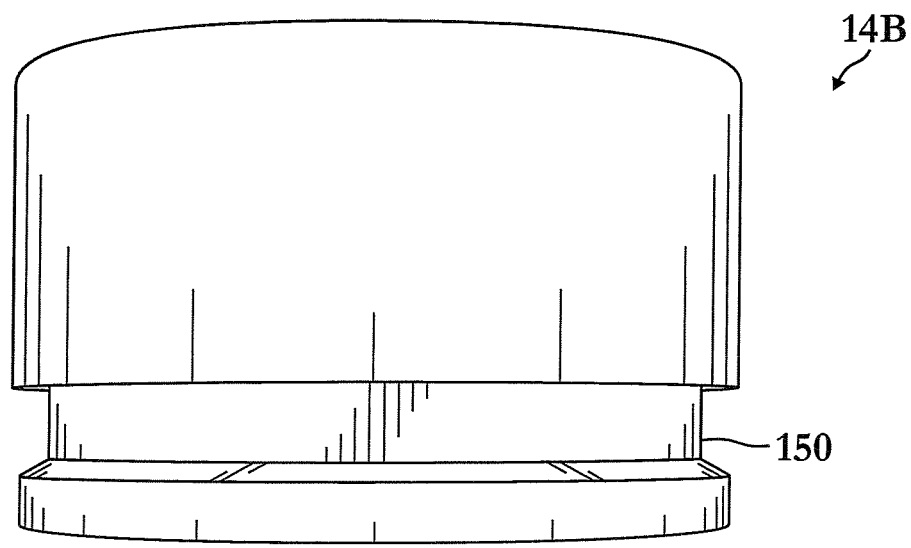
FIG. 48 is a perspective view of an exemplary ring component of the cyclonic debris evacuation apparatus of the present application.
Figure 49:
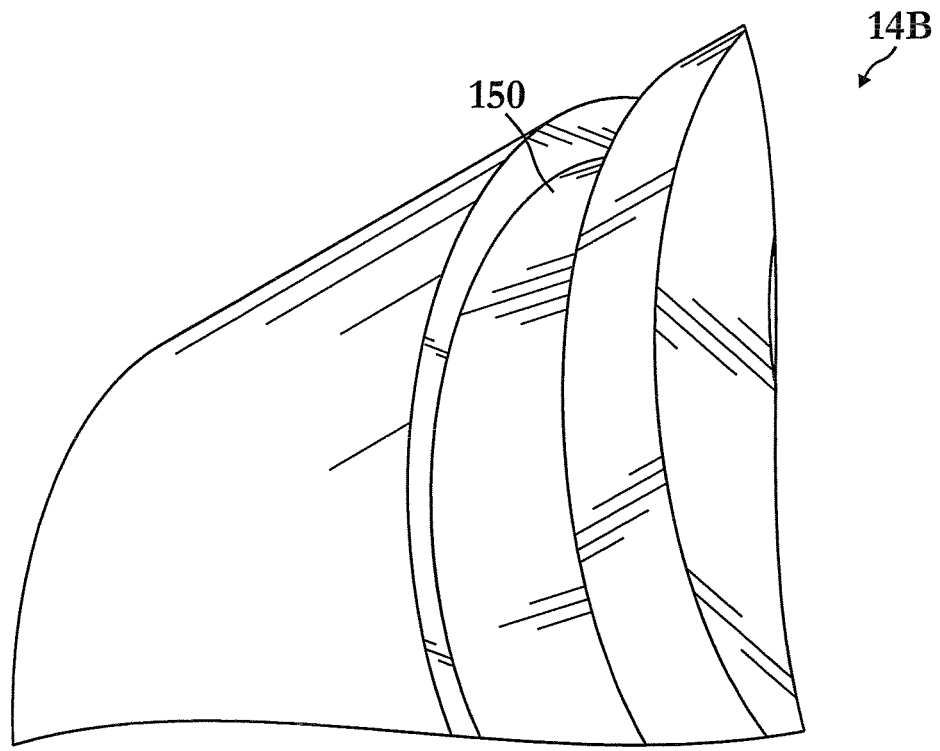
FIG. 49 is a side view of the exemplary ring component of FIG. 48.
Figure 50:
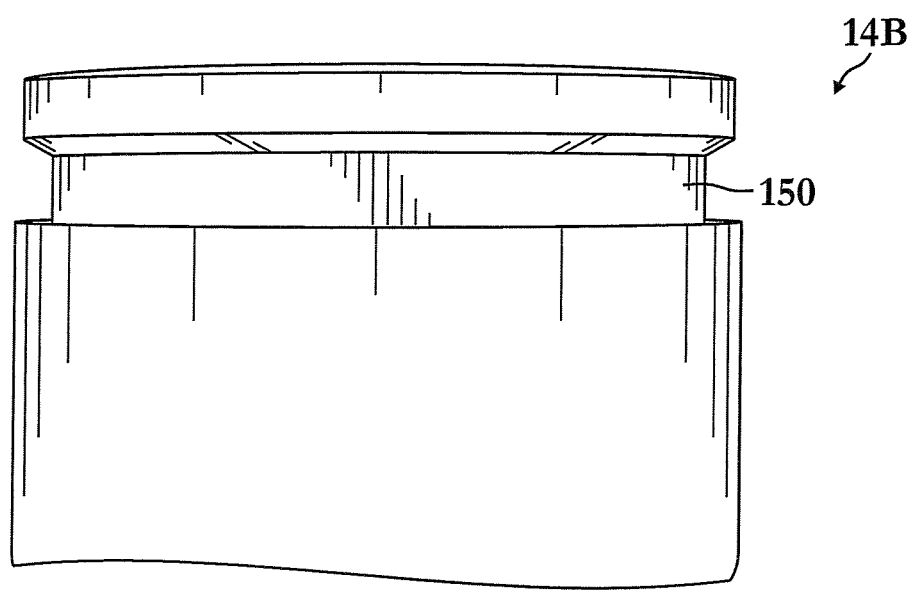
FIG. 50 is a top view of the exemplary ring component of FIG. 48.

With reference now to FIGS. 48-50, an alternative cup component 14B is shown. The cup component 14B includes a groove 150 that separates two portions of the cup component 14B. In a preferred embodiment, the cup component 14B can be made of a high density poly-fiber material. The high density poly-fiber material can naturally have some flexibility that provides unique advantages. For example, when the pump is on an upstroke, the high density poly-fiber material expands, which permits a positive seal to be created between the cup component 14B and pump barrel. This positive seal can help prevent solid impurities from sliding between the cup component 14B and pump barrel interior. Further, the high density poly-fiber material of the cup component 14B can grip to an O-ring device 60 positioned in groove 62, thereby helping to securely couple the cup component 14B in place over the cyclone component 12. In this way, the cup component 14B can be "floating" and capable of self-adjusting and becoming substantially centered over the cyclone component 12 and, in turn, substantially centered when positioned at various heights within a pump barrel, as would occur during pumping operations.

Figure 20:
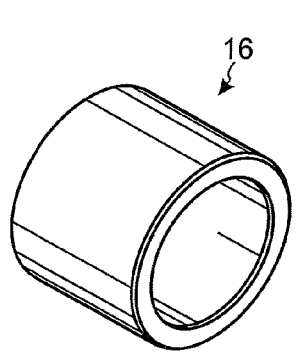
FIG. 20 is a perspective view of an exemplary ring component of the cyclonic debris evacuation apparatus of the present application.
Figure 21:
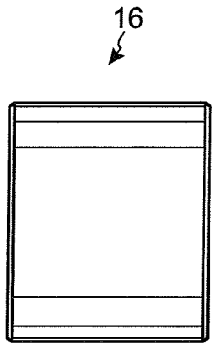
FIG. 21 is a side view of the exemplary ring component of FIG. 20.
Figure 22:
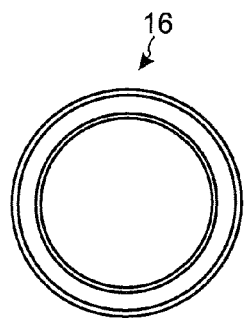
FIG. 22 is a top view of the exemplary ring component of FIG. 20.
Figure 23:
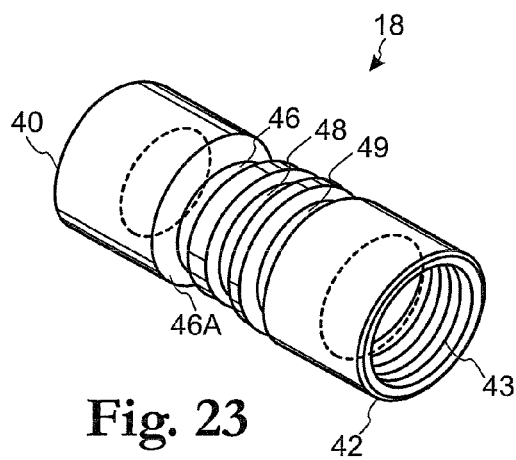
FIG. 23 is a perspective view of an exemplary ring coupler component of the cyclonic debris evacuation apparatus of the present application.
Figure 24:
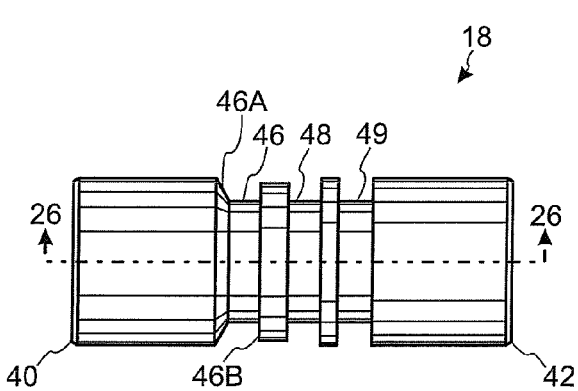
FIG. 24 is a side view of the exemplary ring coupler component of FIG. 23.
Figure 25:
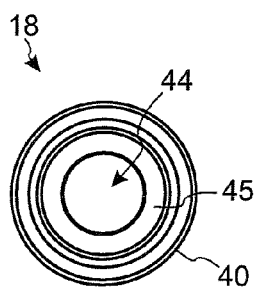
FIG. 25 is a top view of the exemplary ring coupler component of FIG. 23.
Figure 26:
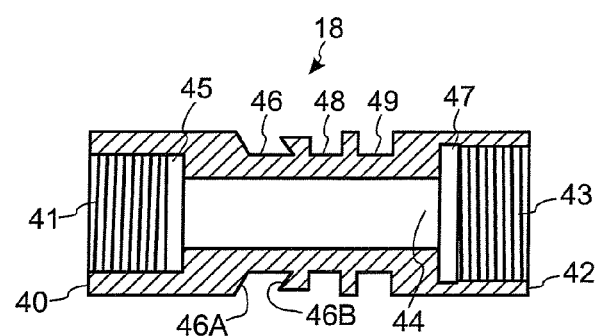
FIG. 26 is a cross-sectional view of the exemplary ring coupler component of FIG. 24, taken along line 26-26.
Figure 27:
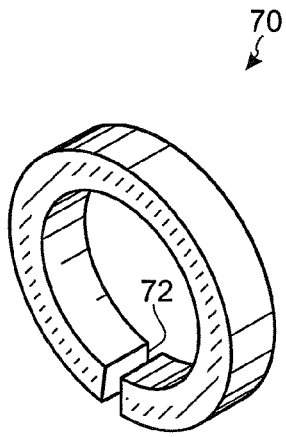
FIG. 27 is a perspective view of an exemplary seal device to be utilized with a cyclonic debris evacuation apparatus, consistent with an embodiment of the present application.
Figure 28:
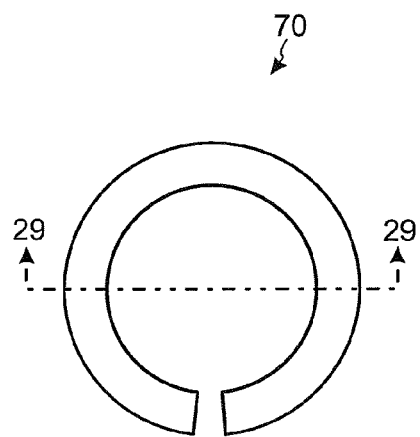
FIG. 28 is a top view of the exemplary seal device of FIG. 27.
Figure 29:
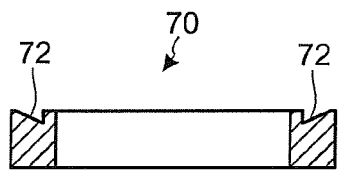
FIG. 29 is a cross-sectional view of the exemplary seal device of FIG. 28, taken along line 29-29.

Referring now to FIGS. 20-22, the ring component 16 will be described. The ring component 16 comprises a cylindrical unit that is adapted to fit over a southern portion of the cyclone component 12, south of the cup component 14 (as seen in FIGS. 1 and 2, for example). Preferably, the ring component 16 is composed of a hardened material, such as carbide, an alloy, or some other suitable hardened material that is capable of crushing any solid impurities that do pass between the cup component 14 and the interior diameter of the barrel. In another embodiment, the ring component 16 can be coated with a material such as carbide, nickel, an alloy, or the like. In one embodiment, the ring component 16 can be comprised of carbide having a Rockwell hardness of about 87, but the ring component could have a Rockwell hardness that varies from this. The ring component 16 can grip to an O-ring device 60 positioned in grooves 64 of the cyclone component 12, thereby helping to securely couple the ring component 16 in place over the cyclone component 12. In this way, the ring component 16 can be "floating" and capable of self-adjusting and becoming substantially centered over the cyclone component 12 and, in turn, substantially centered when positioned at various heights within a pump barrel, as would occur during pumping operations.

Figure 51:
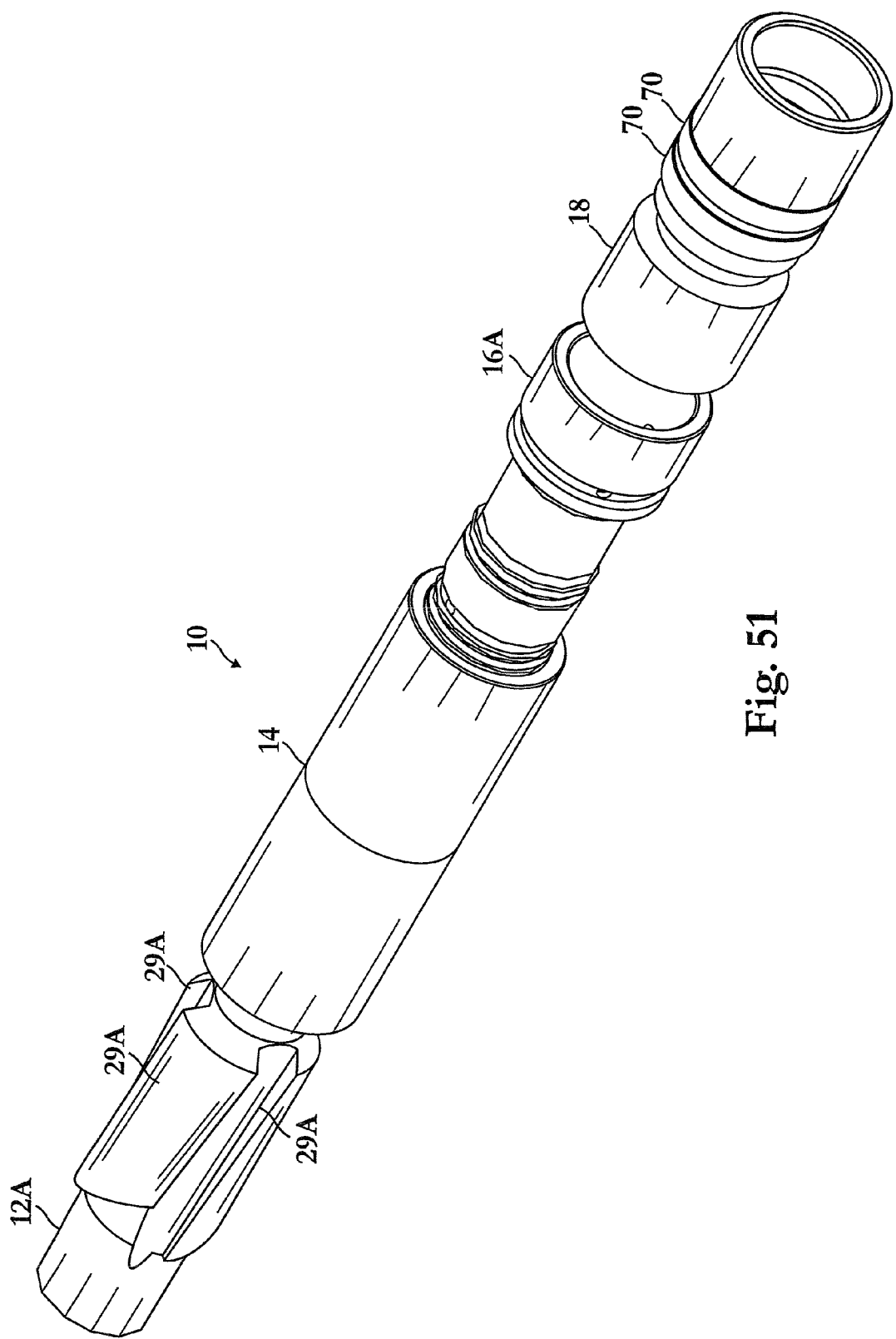
FIG. 51 is a top perspective view of an exemplary cyclonic debris evacuation apparatus having a modified ring component, consistent with an embodiment of the present application.

Now referring to FIGS. 51-59, an embodiment showing a modified ring component 16A is provided. The ring component 16A can be a cylindrical unit that is adapted to fit over a southern portion of the cyclone component 12A, south of the cup component 14 (as seen in FIG. 51, for example). Those skilled in the relevant art will appreciate that the ring component 16A can also be incorporated into other embodiments disclosed herein. For instance, the cyclone component 12A shown can be replaced with the cyclone component 12 of FIGS. 1-3.

The ring component 16A can assist in keeping solids from passing twice over the cup thereby reducing the wear and keeping the cup component 14 from premature failure. Solids can generally pass the cup as it wears and settles atop the ring component 16A. The cup component 14 can be designed to shear in the event solids overwhelm the cup component 14, which could cause the pump plunger to seize. The cup component 14 can allow the pumping action to continue without causing damage to the rods or barrel/pump by shearing itself away from the main body of the apparatus 10. The sheared cup component 14 can slide up and down with the pump action once it release or un-seizes.

The ring component 16A can be composed of a hardened materials described above. The modified ring component 16A can also made of different materials as its purpose is no longer to crush solid impurities that pass between the cup component 14 and the interior diameter of the barrel. The ring component 16A can be made of carbide and be referred herein as a carbide ring. FIG. 51 depicts the cyclonic debris evacuation apparatus 10 having the cyclone component 12A removed from the cup component and detached from the ring coupler component 18, with the bottom portion of the cyclone component 12A showing.

The ring component 16A can grip to an O-ring device positioned in grooves 64 of the cyclone component 12A, thereby helping to securely couple the ring component 16A in place over the cyclone component 12A. In this way, the ring component 16A can be "floating" and capable of self-adjusting and becoming substantially centered over the cyclone component 12A and, in turn, substantially centered when positioned at various heights within a pump barrel, as would occur during pumping operations.

Figure 52:
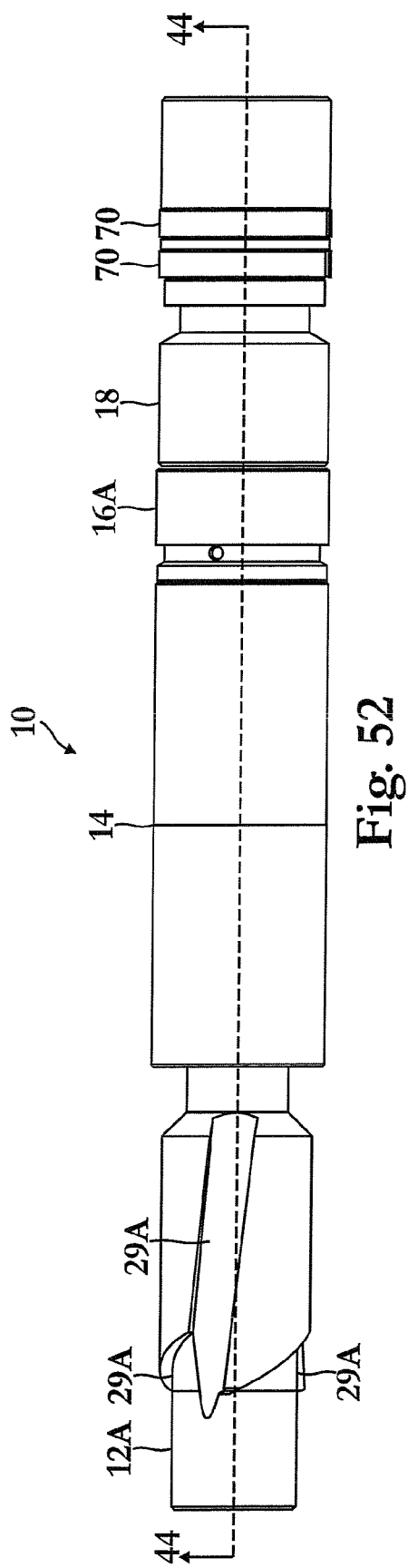
FIG. 52 is a side view of the exemplary cyclonic debris evacuation apparatus of FIG. 51.
Figure 53:
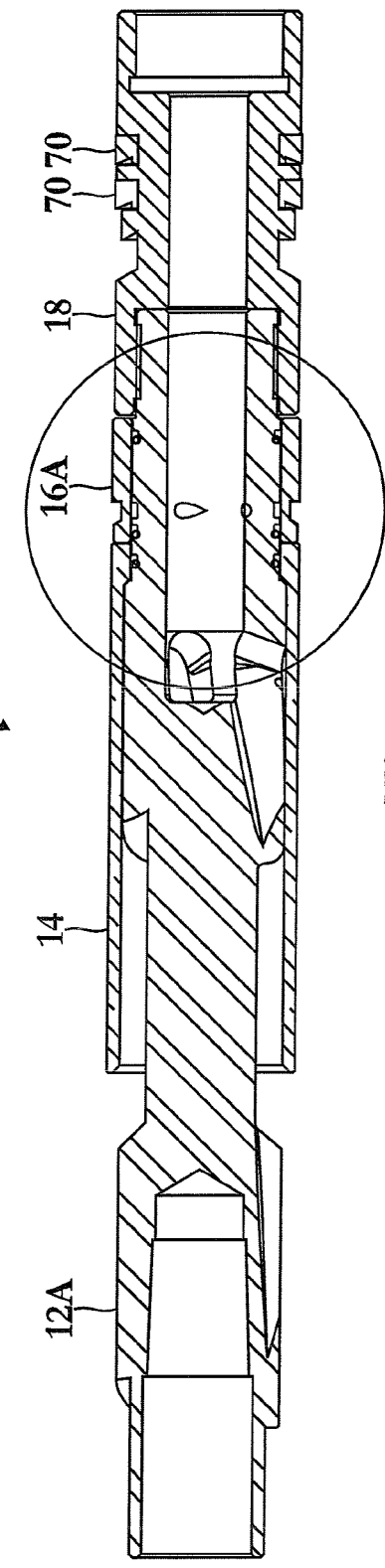
FIG. 53 is a cross-section of the exemplary cyclonic debris evacuation apparatus of FIG. 52, taken along line 44-44.

With reference now to FIG. 52, a side view of the exemplary cyclonic debris evacuation apparatus 10 when assembled is shown. Many of the same components described above are shown therein. FIG. 53 is a cross-section of the exemplary cyclonic debris evacuation apparatus 10 of FIG. 52, taken along line 44-44. The cross-section shows the cyclone component 12A extending past the cup component 14 and modified ring component 16A ending at the ring coupler component 18.

Figure 54:
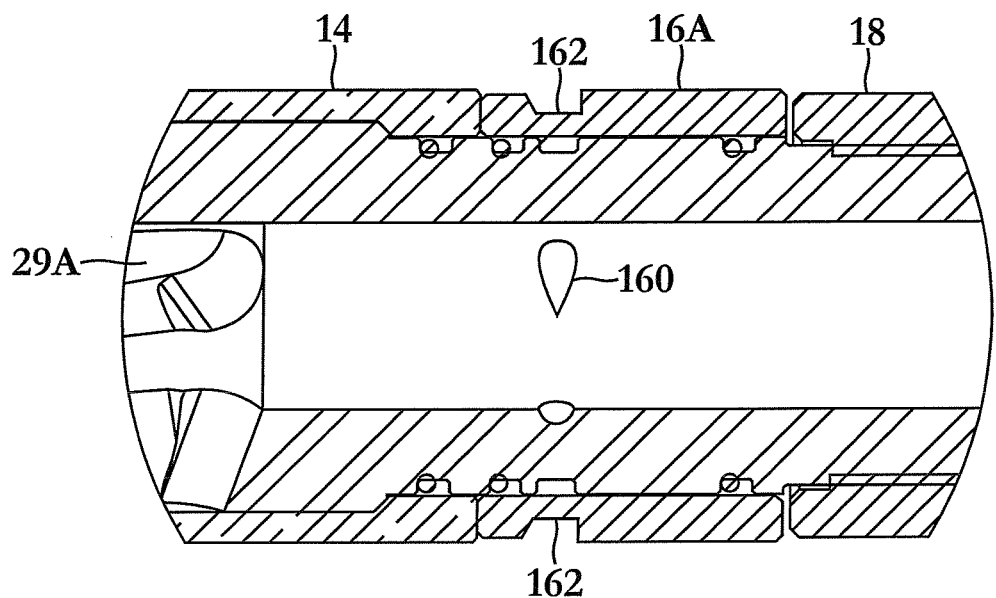
FIG. 54 is an exploded view of the portion identified by circle A shown in FIG. 53.

Turning now to FIG. 54, an exploded view of the portion identified by circle A shown in FIG. 53 is provided. The ring component 16A can have a tapered groove 162 that captures solids keeping them off the barrel which could cause barrel wear. The groove 162 can extend along an outer diameter of the ring component 16A. The channel can be cut three hundred and sixty (360) degrees around the shaft of the evacuation apparatus 10.

In the groove 162, a number of holes or ports 160 can be placed therein. In one embodiment, three ports 160 can be placed within the groove 162 and spaced equidistant from each other. The groove 162 can accumulate solids gathered from the barrel wall and allow the solids to escape inward thru the ports 160 in the ring component 16A. In one embodiment, the ports 160 are angled. Through the angled ports 160, the interior flow section of the cyclone component 12A can be accessed. The angled ports 160 can allow a venture effect that causes the solids to flow inwards into the ports 160.

After the solids enter through the ports 160, they can enter into the main flow section of the cyclone component 12A where the solids are swept away into the flow keeping the cup component 14 and barrel and plunger from additional wear. Without this improvement, typically solids would move back and forth on the outer diameter of the cup component 14 causing cup component 14, barrel, and plunger wear.

Figure 55:
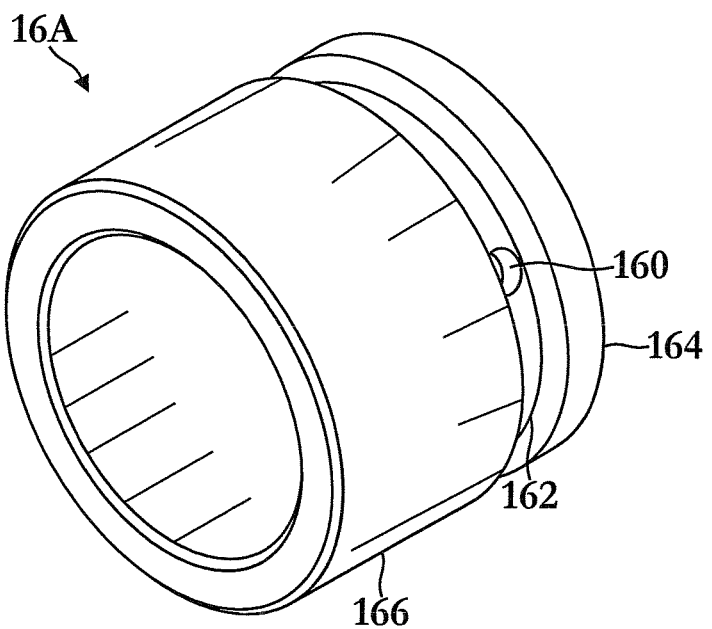
FIG. 55 is a bottom perspective view of the exemplary modified ring component, consistent with an embodiment of the present application.

Now referring to FIG. 55, a bottom perspective view of the exemplary modified ring component 16A is provided. The ring component 16A can incorporate a top portion 164 and a bottom portion 166 separated by the groove 162. The top portion 164 and bottom portion 166 typically incorporates an outer diameter that matches that of the evacuation apparatus 10. The interior diameter of the portions 164 and 166 and groove 162 can have a diameter such that the cyclone component 12A can fit there through.

While the groove 160, as illustrated, includes a narrow channel, those skilled in the relevant art will appreciate that the groove 160 can extend further towards the top portion 164 and/or bottom portion 166. The ports 160 can also be provided in a variety of different forms. Fewer or more ports 160 can be incorporated within the groove 160.

Figure 56:
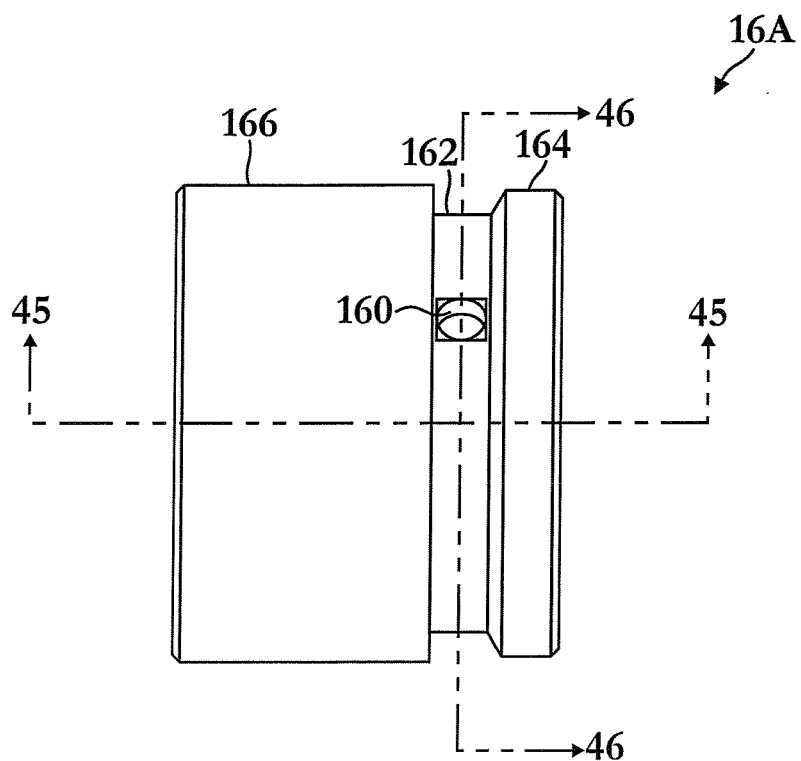
FIG. 56 is a side view of the exemplary modified ring component of FIG. 55.
Figure 57:
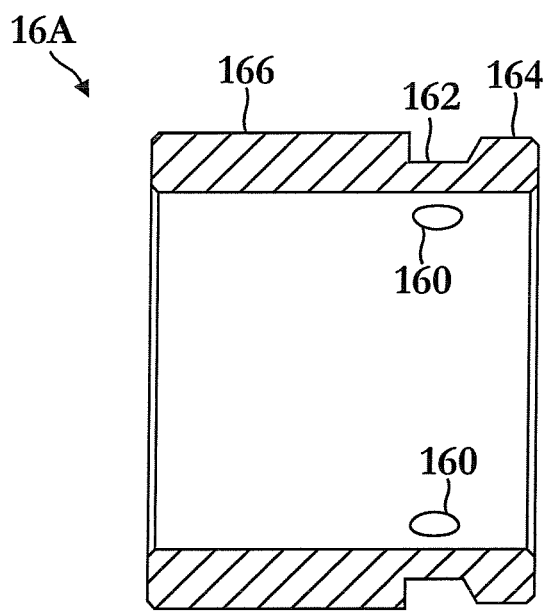
FIG. 57 is a cross-section of the exemplary modified ring component of FIG. 56, taken along line 45-45.

FIG. 56 is a side view of the exemplary modified ring component 16A of FIG. 55. As shown and in accordance with one embodiment, the top portion 164 can have a smaller outer diameter than the bottom portion 166. By reducing the outer diameter of the top portion 164, the solids can be trapped below the cup component 14 and be captured in the ports 160 of the ring component 16A. From there, the solids can be swept inward to the main flow of fluid more easily than if both the top portion 164 and bottom portion 166 had the same outer diameters.

In one embodiment, the top section 164 can taper inwards. Now referring to FIG. 57, a cross-section of the exemplary modified ring component of FIG. 56, taken along line 45-45, is provided. The top section 164, as shown more clearly, can incorporate the tapering towards the groove 162. The tapering can allow the modified ring component 16A to collect solids that flow past the cup component 14.

Figure 58:
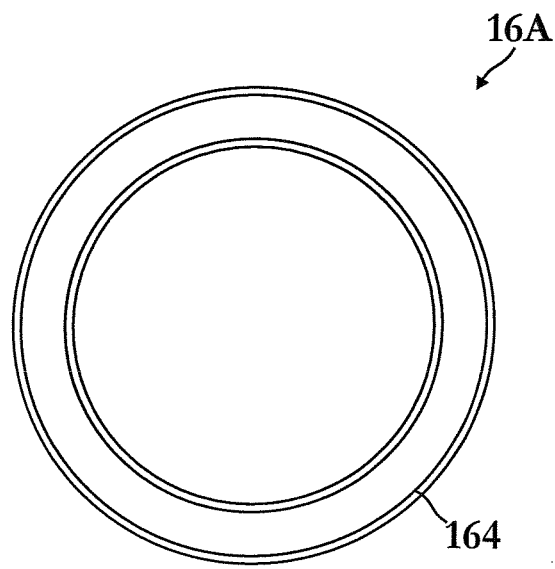
FIG. 58 is a top view of the exemplary modified ring component of FIG. 56.
Figure 59:
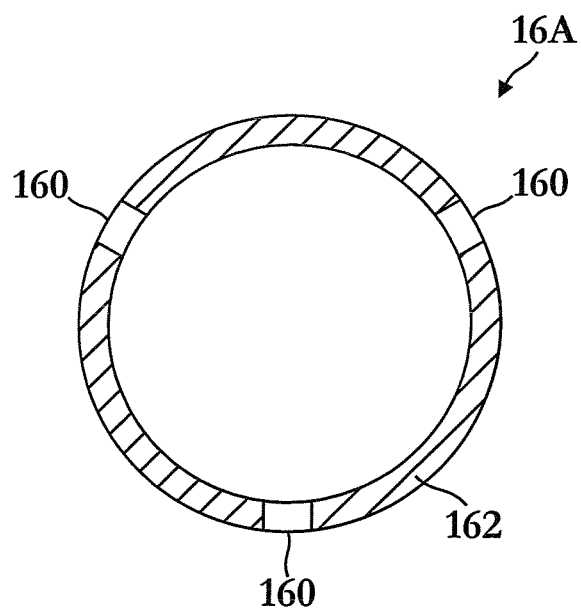
FIG. 59 is a cross-section of the exemplary modified ring component of FIG. 56, taken along line 46-46.

FIG. 58 is a top view of the exemplary modified ring component 16A of FIG. 56. The top portion 164 shown provides a circular shape allowing the cyclone component 12A to fit through. Turning to FIG. 59, a cross-section of the exemplary modified ring component of FIG. 56, taken along line 46-46 is provided. As more clearly shown, the ports 160 can allow solids to pass through the groove 162 into the channel formed within the ring component 16A. It should be noted that although the ring components 16 and 16A are shown in the embodiments of the cyclonic debris evacuation apparatus 10, it can be desired to have other embodiments of the cyclonic debris evacuation apparatus 10 in which the ring components 16 and 16A are omitted.

Turning now to FIGS. 23-26, the ring coupler component 18 will be described. The ring coupler component 18 comprises a substantially cylindrical device having a north end 40, south end 42, and a longitudinal channel 44 running there between. A first threaded region 41 is included in an interior diameter portion of the ring coupler component 18 proximate the north end 40. The threading of the threaded region 41 preferably corresponds to threaded region 23 on the cyclone component 12. In this way, a northern portion of the ring coupler component 18 is adapted to be coupled to a southern portion of the cyclone component 12. While in this embodiment threading is used to couple the ring coupler component 18 and cyclone component 12 together, it can be desired to employ other suitable coupling mechanisms.

A first shoulder 45 is positioned south of the threaded region 41. When the ring coupler component 18 is coupled to the cyclone component 12, the south end 22 of the cyclone component 12 can rest against the shoulder 45. A second threaded region 43 is included in an interior diameter portion of the ring coupler component 18 proximate the south end 42. The threading of the threaded region 43 preferably corresponds to threading on a standard pump plunger, such that a southern portion of the ring coupler component 18 can be coupled to the pump plunger. While in this embodiment threading is used for purposes of coupling the ring coupler component 18 to a pump plunger, it can be desired to employ other suitable coupling mechanisms. A second shoulder 47 is positioned north of the threaded region 43. When the ring coupler component 18 is coupled to a pump plunger, a north end of the pump plunger can rest against the shoulder 47.

In this embodiment, the ring coupler component 18 includes a groove-like portion comprising an accumulator region 46. The accumulator region 46 includes a north shoulder 46A and a south shoulder 46B. Preferably, the north shoulder 46A and south shoulder 46B are each downwardly-tapered. Such downward tapering helps to facilitate the trapping of solid impurities, thereby preventing them from sliding further southward in the direction of the pump plunger. Also in this embodiment, the ring coupler component 18 includes grooves 48 and 49. The grooves 48 and 49 are positioned southward of the accumulator region 46 and are each adapted to receive a seal 70 (shown in FIGS. 1-3 and 27-29). In this embodiment, two grooves 48 and 49 and two seals are employed. However, it would be possible to configure a ring coupler component 18 having more than two or less than two grooves 48 and 49 and seals 70. The ring coupler component 18 can be composed of a hardened material, such as carbide, an alloy or some other suitable material.

With respect to the seals 70, preferably, they are composed of a durable plastic or some other suitable material capable of withstanding conditions present in typical well environments. In one embodiment, it can be desired to utilize a pressure actuated ring seal called the Darcova XT®, sold by Darcova, Inc. The seals 70 assist in preventing solid impurities from travelling further southward toward the pump plunger. In this embodiment, a first seal 70, when positioned in groove 49, aligns flush with the overall outer diameter of the ring coupler component 18. Preferably, an area of the ring coupler component 18 north of the groove 48 has in outer diameter that is slightly smaller than an overall outer diameter of the ring coupler component 18. In this way, when a second seal 70 is positioned in groove 48, a lip 72 of the seal 70 protrudes slightly from the ring coupler component 18. Preferably, the lip 72 is downwardly tapered, as shown in detail in FIG. 29. In this way, the lip 72 is adapted to trap solid impurities, thereby helping to prevent them from sliding past seal 70 positioned in groove 48 and travelling further southward in the direction of the pump plunger. In particular, the lip 72 can trap solid impurities that have slid past the accumulator region 46.

Referring now to FIGS. 33-40, a cyclonic debris evacuation apparatus 100 consistent with an embodiment of the present application is shown. The cyclonic debris evacuation apparatus 100 is similar to the cyclonic debris evacuation apparatus 10, but includes unique features such that it is configured for use with a pumping system employing a hollow valve rod. For individual components of the cyclonic debris evacuation apparatus 100 that are the same as components on the cyclonic debris evacuation apparatus 10, like numbers are used.

Beginning from the north end, the main components of this embodiment of the cyclonic debris evacuation apparatus 100, which has a substantially cylindrical external configuration, include the following: (a) a hollow valve rod coupler component 112, (b) a cup component 14, (c) a ring component 16, and (d) a ring coupler component 18. The overall length of the cyclonic debris evacuation apparatus 100 can range from approximately one foot to six feet or more. However, it should be clearly understood that substantial benefit could be derived from a cyclonic debris evacuation apparatus 100 having a length that deviates from these dimensions, even substantially, in either direction. For certain embodiments, it can be desired to extend the overall length of the cyclonic debris evacuation apparatus 100 by providing more than one coupler pieces, such as the ring coupler component 18 or the like, which can be adapted to be coupled together end-to-end. The cyclonic debris evacuation apparatus 100 is adapted to be coupled, at a northern-most portion thereof, to a hollow valve rod, and at a southern-most portion thereof, to a pump plunger, as further discussed below.

Figure 33:
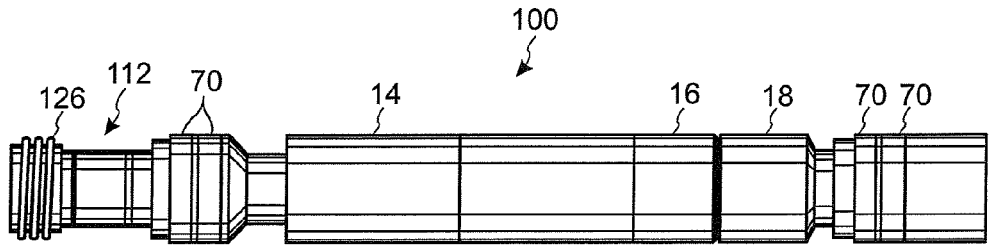
FIG. 33 is a front view of an exemplary cyclonic debris evacuation apparatus, consistent with an embodiment of the present application.
Figure 37:
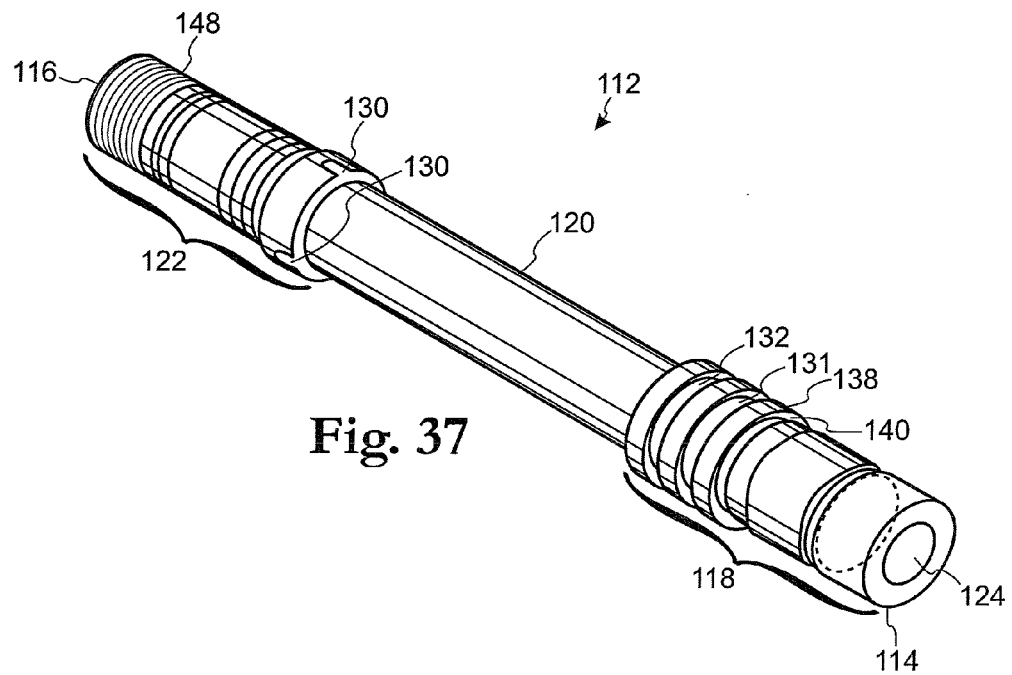
FIG. 37 is a perspective view of an exemplary hollow valve rod coupler component of the cyclonic debris evacuation apparatus of the present application.
Figure 38:
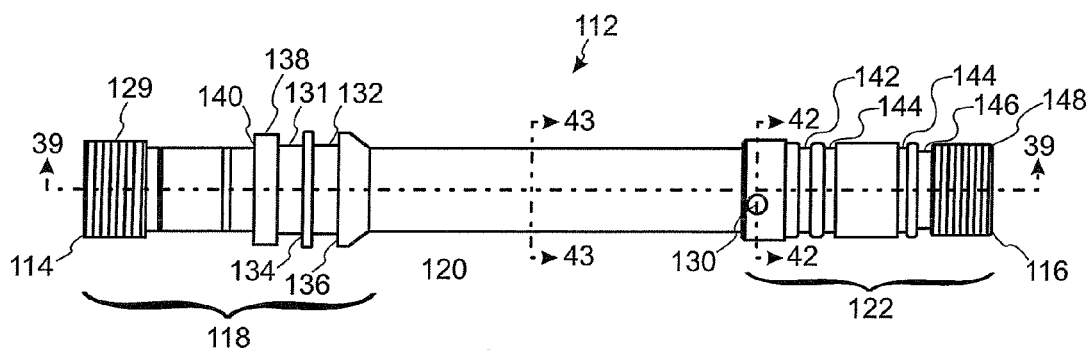
FIG. 38 is a side view of the exemplary hollow valve rod coupler component of FIG. 37.
Figure 39:
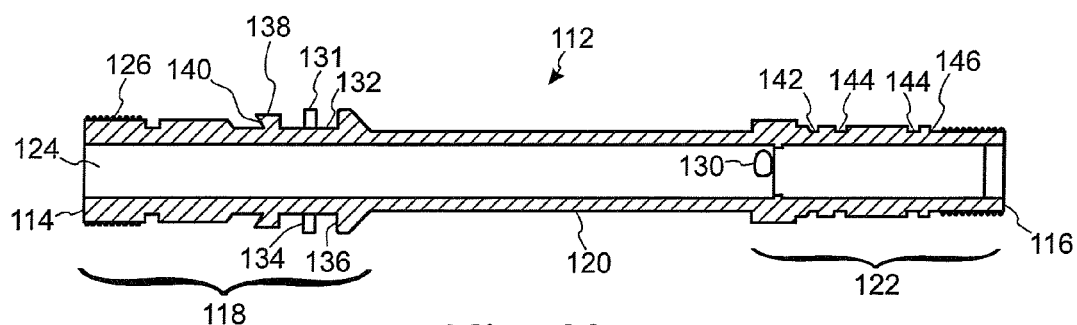
FIG. 39 a cross-sectional view of the exemplary hollow valve rod coupler component of FIG. 38, taken along line 39-39.
Figure 40:
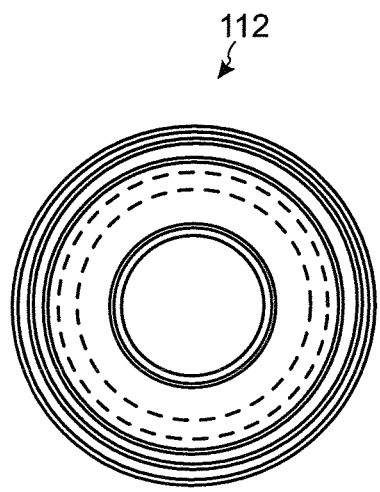
FIG. 40 is a bottom view of the exemplary hollow valve rod coupler component of FIG. 37.
Figure 41:
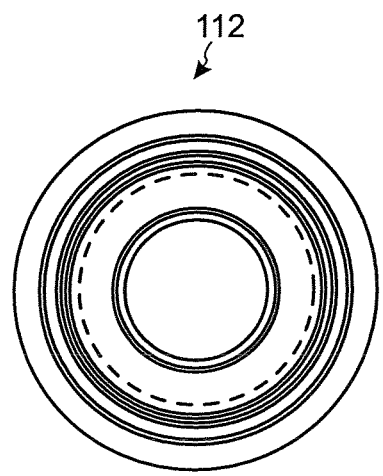
FIG. 41 is a top view of the exemplary hollow valve rod coupler component of FIG. 37.

Referring to FIGS. 37-39, the hollow valve rod coupler component 112 will be described. In this embodiment, the hollow valve rod coupler component 112 is a one-piece structure comprising a substantially elongated member having a north end 114, south end 116, head 118, neck 120, and base 128 having a plurality of openings 130. A channel 124 runs longitudinally through the hollow valve rod coupler component 112 and is adapted to communicate with channel 44 in the ring coupler component 18, allowing passage of fluid there through. The hollow valve rod coupler component 112 is adapted to be coupled, at its north end 114, to a hollow valve rod. External threading 126, as shown in FIG. 33, can be included for purposes of coupling the hollow valve rod coupler component 112 to the hollow valve rod. Alternatively, threading can be included in the interior diameter of a northern portion of the head 118, for this purpose.

The head 118 of the hollow valve rod coupler component 112 includes grooves 131 and 132 defining shoulders 134 and 136, respectively. While in this embodiment two grooves 131 and 132 are included in head 118, it can be desired to fashion a hollow valve rod coupler component 112 having more than two or less than two grooves 131 and 132. The grooves 131 and 132 are each adapted to receive a seal 70 (shown in FIGS. 27-29 and 33-36, for example). In this embodiment, the head 118 of the hollow valve rod coupler component 112 further includes an accumulator region 138. The accumulator region 138 includes a lip 140. Preferably, the lip 140 is downwardly-tapered. Such downward tapering helps to facilitate the trapping of solid impurities, thereby preventing them from sliding further southward in the direction of the pump plunger. With respect to grooves 131 and 132, these are positioned southward of the accumulator region 138.

With respect to the seals 70, preferably, they are composed of a durable plastic or some other suitable material capable of withstanding conditions present in typical well environments. In one embodiment, it can be desired to utilize a pressure actuated ring seal called the Darcova XT®, sold by Darcova, Inc. The seals 70 assist in preventing solid impurities from travelling further southward toward the pump plunger. In this embodiment, a first seal 70, when positioned in groove 132, aligns flush with an outer diameter of the head 118. Preferably, an area of the head 118 north of the groove 131 has in outer diameter that is slightly smaller than an outer diameter directly south of groove 131. In this way, when a second seal 70 is positioned in groove 131, a lip 72 of the seal 70 protrudes slightly from the head 118. Preferably, the lip 72 is downwardly tapered, as shown in detail in FIG. 29. In this way, the lip 72 is adapted to trap solid impurities, thereby helping to prevent them from sliding past seal 70 positioned in groove 131 and travelling further southward in the direction of the pump plunger. The head 118 further includes a leading shoulder 138. The leading shoulder 138 preferably has a downwardly tapered lip 140. In this way, the lip 140 is adapted to trap solid impurities. Solid impurities that slide past the lip 140 can be trapped by lip 72 on seal 70 positioned in groove 131.

Figure 42:
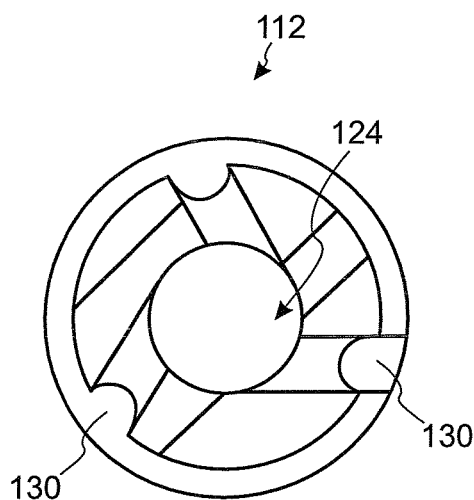
FIG. 42 is a cross-sectional view of a portion of the exemplary hollow valve rod coupler component of FIG. 38, taken along line 42-42.
Figure 43:
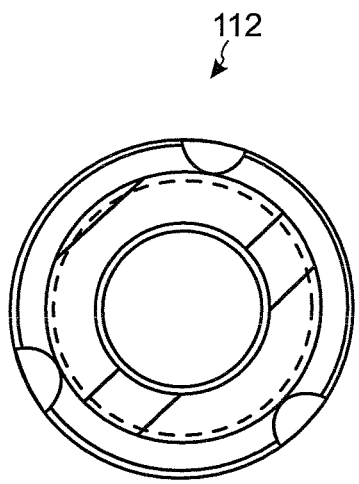
FIG. 43 is a cross-sectional view of a portion of the exemplary hollow valve rod coupler component of FIG. 38, taken along line 43-43.
Figure 44:
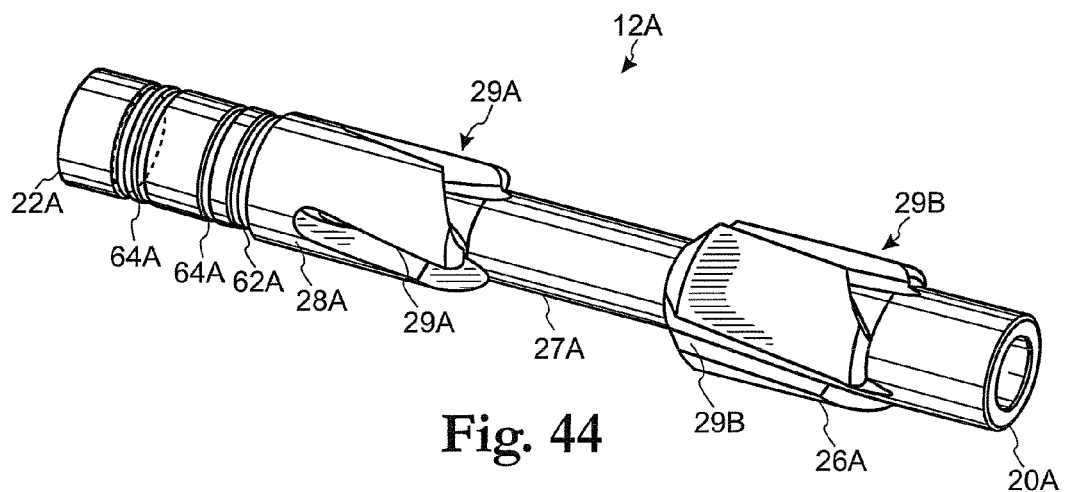
FIG. 44 is a perspective view of an embodiment of a cyclone component of the exemplary cyclonic debris evacuation apparatus of the present application.
Figure 45:
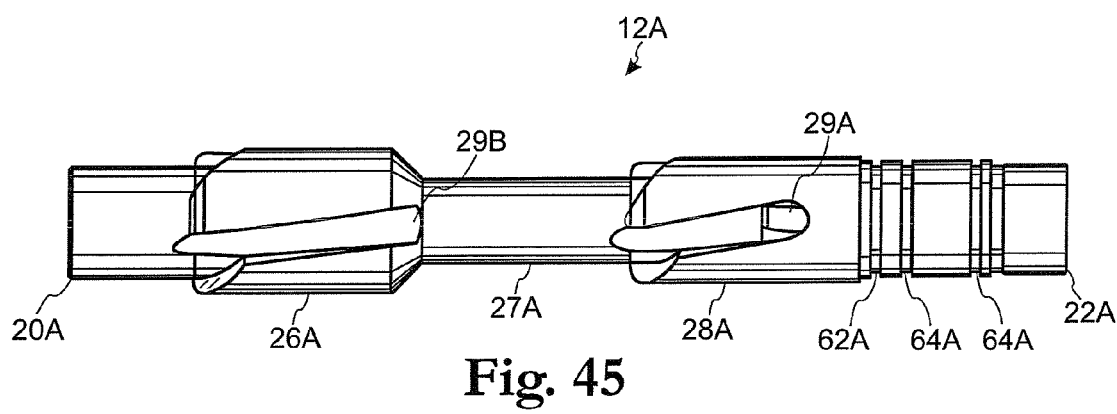
FIG. 45 is a side view of the exemplary cyclone component of FIG. 44.
Figure 46:
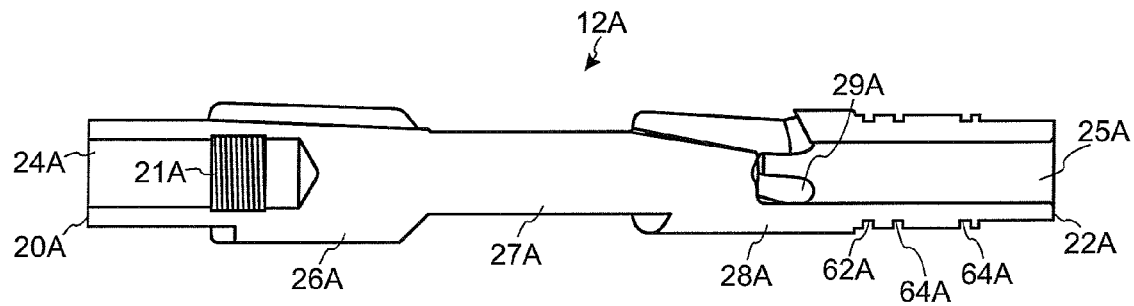
FIG. 46 is a cross-sectional view of the exemplary cyclone component of FIG. 44.
Figure 47:
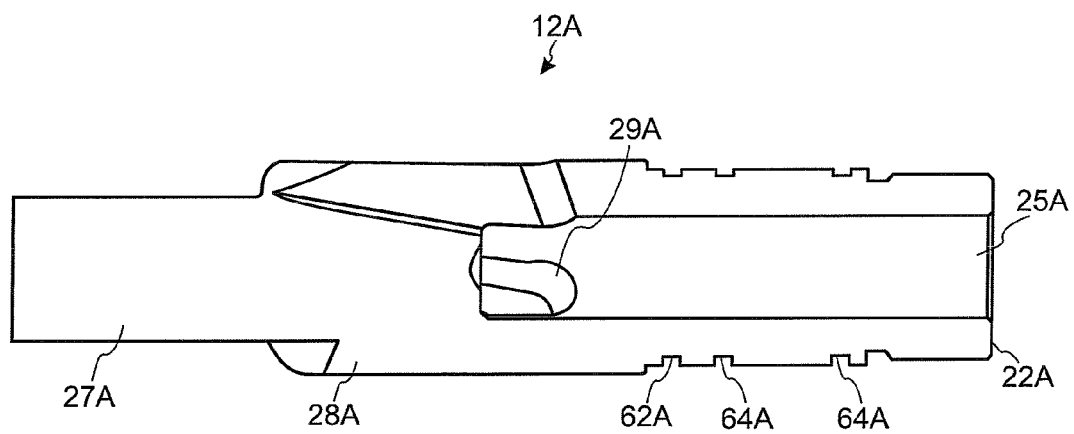
FIG. 47 is a cross-sectional view of a portion of the exemplary cyclone component of FIG. 44.

The neck 120, in this embodiment, has an overall outer diameter that is less than the outer diameter of a portion of the head 118 positioned north of the neck 120. The neck 120 extends from a southern portion of the head 118 to a northern portion of the base 122. South of the neck 120 is the base 122, which includes the plurality of openings 130. In this embodiment, three openings are included in the base 122. However, it can be desired to configure a hollow valve rod coupler component 112 having more than three or less than three openings 130. In one embodiment, the openings are off-set from a center of longitudinal channel 124, as best seen in FIGS. 39 and 42. In this way, the openings 130 assist in facilitating the rotation of fluid with solids during pumping operations. Thus, as fluid enters the openings 130, the fluid is caused to spin by the angled design of the openings 130 and is directed away from the pump barrel as it travels northward through the pumping system. In this embodiment, and as seen in FIG. 42, the openings 130 extend toward longitudinal channel 124 on an angle. In this embodiment, the openings 130 are spaced equidistant from each other.

The base 122, in this embodiment, includes grooves 142 and 144, and shoulder 146, each positioned south of the openings 130 on the hollow valve rod coupler component 112. In this embodiment, one groove 142 and two grooves 144 are utilized, but it should be noted that it would be possible to vary the number of grooves 142 and 144, as desired. The grooves 142 and 144 are each adapted to receive an O-ring device 60 (as shown in FIGS. 30-32). An O-ring device 60 positioned in groove 142 can be useful for helping to secure and align the cup component 14 in position over the hollow valve rod coupler component 112. An O-ring device 60 (or devices 60) positioned in grooves 144 can be useful for helping to secure and align the ring component 16 in position over the hollow valve rod coupler component 112.

Preferably, the south end 116 of the hollow valve rod coupler component 112 includes a threaded region 148, such that the hollow valve rod coupler component 112 can be coupled to the ring coupler component 18, as further discussed below.

The hollow valve rod coupler component 112 is preferably adapted to be fitted in the cup component 14, as further discussed below. In this embodiment, when the hollow valve rod coupler component 112 is positioned in the cup component 14, the head 118 and a portion of the neck 120 protrude from a northern portion of the cup component 14, while threaded region 148 is exposed below a southern portion of the cup component 14. In a preferred embodiment, when an O-ring device 60 is positioned in groove 142, the cup component 14 can be pushed into position over the hollow valve rod coupler component 112. The O-ring device 60 will help to align the cup component 14 over the hollow valve rod coupler component 112, so that the hollow valve rod coupler component 112 is substantially centered within the cup component 14. In another embodiment, the hollow valve rod coupler component 112 can include threading north of its south end 116, such that the hollow valve rod coupler component 112 can be coupled to the cup component 14, as further discussed below. Preferably, the hollow valve rod coupler component 112 is composed of a hardened material, such as carbide, an alloy or some other suitable material.

With respect to the cup component 14 utilized with the cyclonic debris evacuation apparatus 100, it is the same as the cup component 14 utilized with the cyclonic debris evacuation apparatus 10, previously discussed in detail, above, and as shown in FIGS. 10-13. The discussion above concerning the cup component 14 is hereby incorporated herein by reference, to the extent not repeated below. When utilized with the cyclonic debris evacuation apparatus 100, the cup component 14 is adapted to receive and fit over a portion of the hollow valve rod coupler component 112 (as seen in FIGS. 33-36). Preferably, the north end 30 of the cup component 14 tapers inward (as shown in FIG. 13, for example), which helps in directing solid impurities into the interior diameter of the cup component 14. In the embodiment of the cup component 14 shown in FIGS. 10-13, a first segment 36 of the channel 34 proximate the south end 32 has an interior diameter that is less than the interior diameter of the channel 34 overall. In this way, when the cup component 14 is fitted over the hollow valve rod coupler component 112, the cup component 14 can be firmly secured in place.

In a preferred embodiment, the cup component 14 is comprised of a high density poly-fiber material. The high density poly-fiber material naturally has some flexibility that provides unique advantages. For example, when the pump is on an upstroke, the high density poly-fiber material expands, which permits a positive seal to be created between the cup component and pump barrel. This positive seal helps to prevent solid impurities from sliding between the cup component 14 and pump barrel interior. Further, the high density poly-fiber material of the cup component 14 can grip to an O-ring device 60 positioned in groove 142, thereby helping to securely couple the cup component 14 in place over the hollow valve rod coupler component 112. In this way, the cup component 14 can be "floating" and capable of self-adjusting and becoming substantially centered over the hollow valve rod coupler component 112 and, in turn, substantially centered when positioned at various heights within a pump barrel, as would occur during pumping operations.

In another embodiment, the cup component 14 can include threading that is opposite threading on the hollow valve rod coupler component 112 such that the cup component 14 and hollow valve rod coupler component 112 can be coupled together.

The cyclonic debris evacuation apparatus 100 can also be utilized with the cup component 14A (discussed in detail above and shown in FIGS. 7-9), as an alternative to cup component 14. The discussion above concerning the cup component 14A is hereby incorporated herein by reference, to the extent not repeated below. The cup component 14A is adapted to receive and fit over a portion of the hollow valve rod coupler component 112. Preferably, the north end 30A of the cup component 14A tapers inward (as shown in FIG. 9, for example), which helps in directing solid impurities into the interior diameter of the cup component 14A. In this embodiment, a first segment 36A of the channel 34A proximate the south end 32A has an interior diameter that is less than the interior diameter of the channel 34A overall. In this way, when the cup component 14A is fitted over the hollow valve rod coupler component 112, the cup component 14A can be firmly secured in place. In particular, an interior portion of the cup component 14A can grip to an O-ring device 60 positioned in groove 142, thereby helping to securely couple the cup component 14A in place over the hollow valve rod coupler component 112. In this way, the cup component 14A can be "floating" and capable of self-adjusting and becoming substantially centered over the hollow valve rod coupler component 112 and, in turn, substantially centered when positioned at various heights within a pump barrel, as would occur during pumping operations.

In another embodiment, the cup component 14A can include threading that is opposite threading on the hollow valve rod coupler component 112 such that the cup component 14A and hollow valve rod coupler component 112 can be coupled together.

The cyclonic debris evacuation apparatus 100 can also be utilized with the cup component 50 (discussed in detail above and shown in FIGS. 14-19), as an alternative to cup component 14. The discussion above concerning the cup component 50 is hereby incorporated herein by reference, to the extent not repeated below. When the cup component 50 is positioned on the cyclonic debris evacuation apparatus 100, preferably, the leading edge 54A faces northward. In one embodiment, the leading edge 54A tapers inward (as shown in FIGS. 15-17, for example), which helps in directing solid impurities into the interior diameter of the cup component 50.

Figure 34:
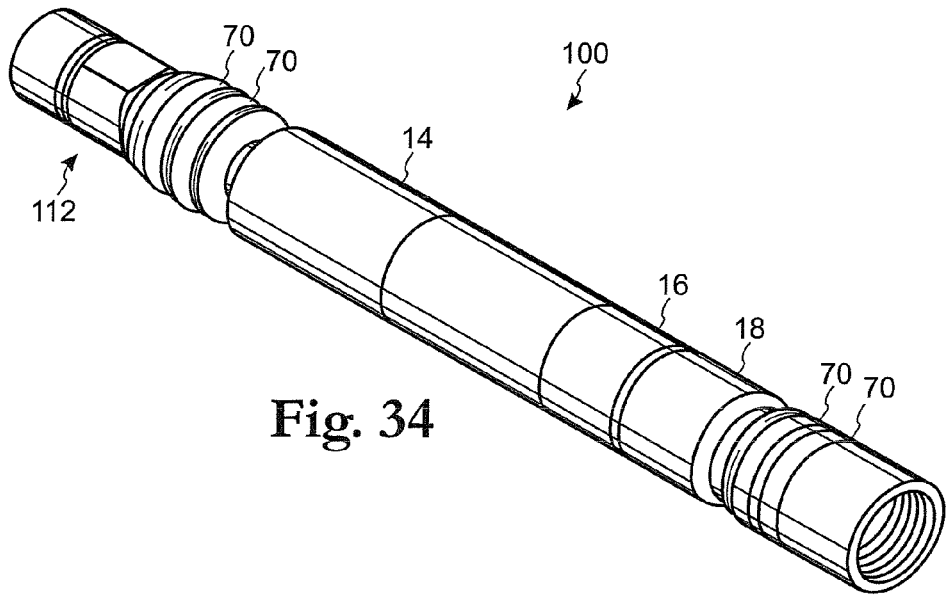
FIG. 34 is a perspective view of the exemplary cyclonic debris evacuation apparatus of FIG. 33, shown without threading at a top portion thereof.
Figure 35:
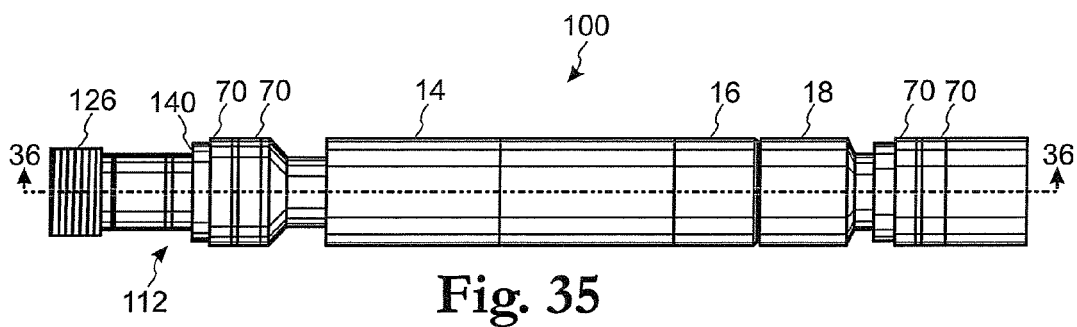
FIG. 35 is a side view of the exemplary cyclonic debris evacuation apparatus of FIG. 33.
Figure 36:
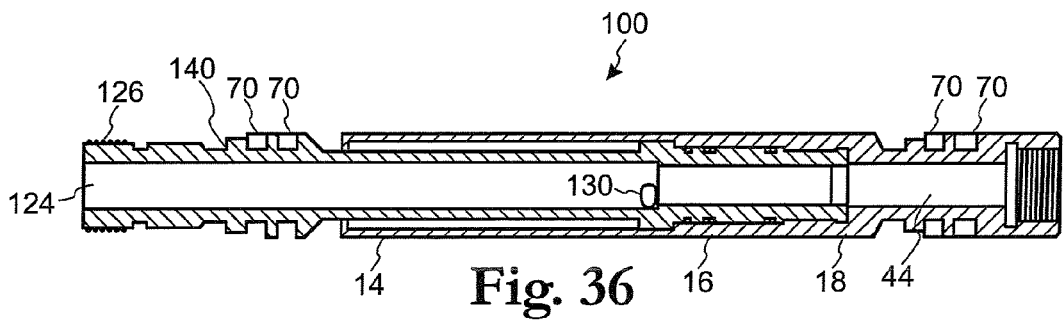
FIG. 36 is a cross-sectional view of the exemplary cyclonic debris evacuation apparatus of FIG. 35, taken along line 36-36.

With respect to the ring component 16 utilized with the cyclonic debris evacuation apparatus 100, it is the same as the ring component 16 utilized with the cyclonic debris evacuation apparatus 10, previously discussed in detail, above, and as shown in FIGS. 20-22. The discussion above concerning the ring component 16 is hereby incorporated herein by reference, to the extent not repeated below. The ring component 16 comprises a cylindrical unit that is adapted to fit over a southern portion of the hollow valve rod coupler component 112, south of the cup component 14 (as seen in FIGS. 33-35, for example). The ring component 16 can grip to an O-ring device 60 positioned in grooves 144 of the hollow valve rod coupler component 112, thereby helping to securely couple the ring component 16 in place over the hollow valve rod coupler component 112. In this way, the ring component 16 can be "floating" and capable of self-adjusting and becoming substantially centered over the hollow valve rod coupler component 112 and, in turn, substantially centered when positioned at various heights within a pump barrel, as would occur during pumping operations.

It should be noted that although the ring component 16 is shown in the embodiment of the cyclonic debris evacuation apparatus 100 of FIGS. 33-36, it can be desired to have other embodiments of the cyclonic debris evacuation apparatus 100 in which the ring component 16 is omitted.

With respect to the ring coupler component 18 utilized with the cyclonic debris evacuation apparatus 100, it is the same as the ring coupler component 18 utilized with the cyclonic debris evacuation apparatus 10, previously discussed in detail, above, and as shown in FIGS. 23-26. The discussion above concerning the ring component 16 is hereby incorporated herein by reference, to the extent not repeated below. A first threaded region 41 is included in an interior diameter portion of the ring coupler component 18 proximate the north end 40. The threading of the threaded region 41 preferably corresponds to threaded region 148 on the hollow valve rod coupler component 112. In this way, a northern portion of the ring coupler component 18 is adapted to be coupled to a southern portion of the hollow valve rod coupler component 112. While in this embodiment threading is used to couple the ring coupler component 18 and hollow valve rod coupler component 112 together, it can be desired to employ other suitable coupling mechanisms.

A first shoulder 45 is positioned south of the threaded region 41. When the ring coupler component 18 is coupled to the hollow valve rod coupler component 112, the south end 116 of the hollow valve rod coupler component 112 can rest against the shoulder 45.

Turning now to FIGS. 60-63, an exemplary cyclonic debris evacuation apparatus 10 for use with tubing pumps, consistent with an embodiment of the present application, is provided. The cyclonic debris evacuation apparatus 10 is similar to those described above, but includes unique features such that it is configured for use with a tubing pump system. For similar components of the cyclonic debris evacuation apparatus 10 like numbers are used.

The main components of this embodiment of the cyclonic debris evacuation apparatus 10, which has a substantially cylindrical external configuration, can include the following: (a) a cyclone component 12A having flutes 29A or cyclone component 12 with flutes 29 (b) a cup component 14, (c) a ring component 16, and (d) a ring coupler component 18. The overall length of the cyclonic debris evacuation apparatus 10 can range from approximately one foot to six feet or more. The cyclonic debris evacuation apparatus 10 is adapted to be coupled, at a northern-most portion thereof, to a sucker rod, and at a southern-most portion thereof, to a pump plunger.

Coupled to the top portion of the cyclonic debris evacuation apparatus 10 is a top plunger adapter 170 as shown in FIG. 61. The top plunger adapter 170 can provide versatility to the cyclonic debris evacuation apparatus 10. In one embodiment, the adapter 170 can include external threading. The external threading can be used to connect the sucker rod to the adapter 170 for a tight fit. In one embodiment, the threading can be located on the sucker rod. External or internal threading can be provided on the adapter 170 to secure the sucker rod. Known to those skilled in the relevant art, numerous other types of locking mechanisms can be used by the adapter 170, sucker rod, or both.

Figure 62:
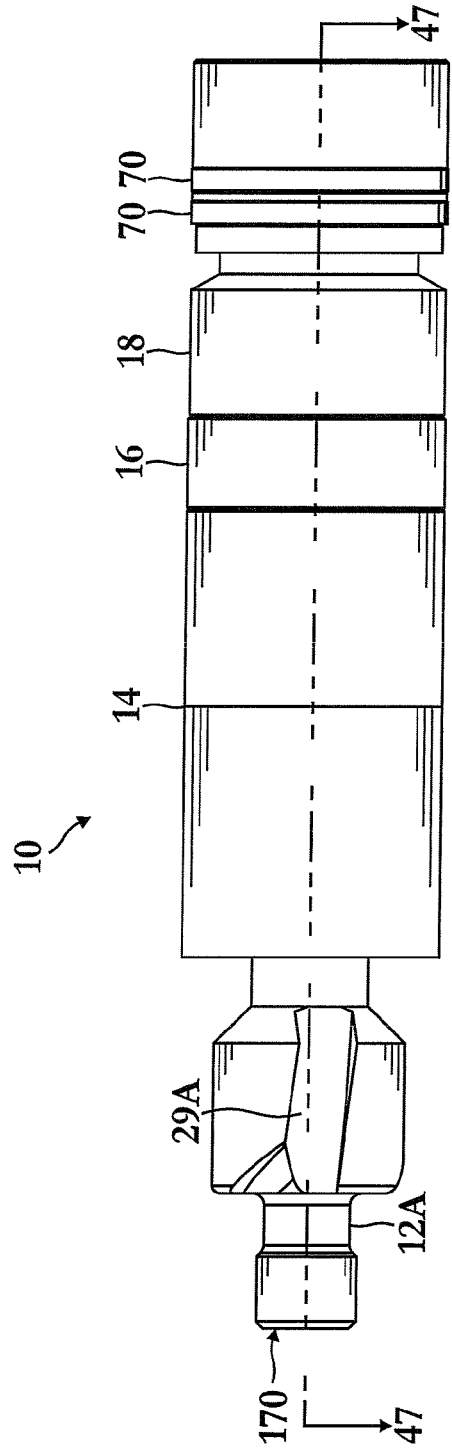
FIG. 62 is a side view of the exemplary cyclonic debris evacuation apparatus of FIG. 60.
Figure 63:
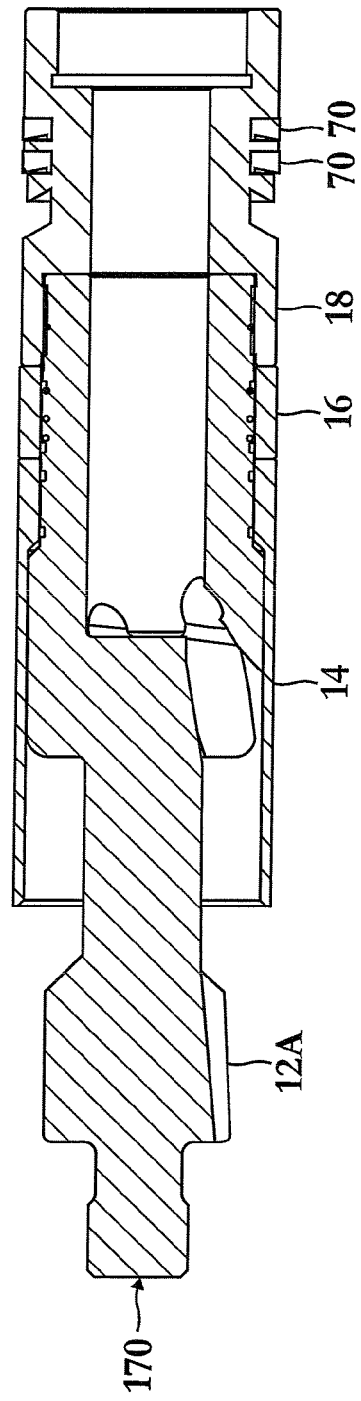
FIG. 63 is a cross-section of the exemplary cyclonic debris evacuation apparatus of FIG. 62, taken along line 47-47.

FIG. 63 is a cross-section of the exemplary cyclonic debris evacuation apparatus 10 of FIG. 62, taken along line 47-47. The tubing pump design utilizes the well tubing for the barrel; therefore there is no need to have an additional barrel. Beforehand, an insert pump and a hollow valve rod were described. The insert pump included female threading 21 with the cyclonic debris evacuation apparatus 10 that allowed a valve rod to be attached. The hollow valve rod included the cyclonic debris evacuation apparatus 100 with the male external threading 126 that had a pathway there through. In the embodiment now provided, the top plunger adapter 170 includes male external threading with no pathway there through to allow a sucker rod connector to be attached. As shown, the adapter 170 is solid. This makes the top plunger adapter 170 unique in that it can be functional on all or most types of down-hole rod pumps.

STATEMENT OF OPERATION

Before assembling the cyclonic debris evacuation apparatus 10 or cyclonic debris evacuation apparatus 100, it is preferred to apply an antiseize lubricant to all external threads, in order to prevent the various components of the cyclonic debris evacuation apparatus 10 or 100 from seizing together. As an example, McMaster-Carr P/N 1820K1 SST antiseize lubricant can be used.

In typical prior art pumping systems, when pumping operations have stopped, solid impurities naturally settle into the space between the plunger and the barrel. When the cyclonic debris evacuation apparatus 10 or 100 of the present application is coupled to a pump plunger, after pumping operations have stopped, solid impurities will settle into the cup component 14 (or 14A or 50), instead of travelling past it and around the plunger, as is typical in standard prior art designs. Upon restarting of the pump the preferred high density poly-fiber material comprising the cup component 14 will load with pressure and will expand on the upstroke, flaring outward. It will then experience little, if any, slippage because the cup component 14 will expand against the interior diameter of the barrel. In this way, a positive seal will be created between the barrel and cup component 14. As a result, on the upstroke, solid impurities that would normally slip southward will be swept inward and away from the inside surface of the barrel and will be redirected to the cup component 14, where they will accumulate. The design of the cyclonic debris evacuation apparatus 10 or 100 hydraulically forces residual solid impurities inwardly to the interior diameter of the plunger. As a result, stuck plungers and excessive barrel damage and wear can be avoided.

On the downstroke, the high density poly-fiber material of the cup component 14 will retract. As this occurs, the design of the flutes 29 in the cyclone component 12 and the openings 130 in the hollow valve rod coupler component 112 causes the fluid that is being pumped and any solid impurities entrained therein to constantly rotate. This rotation permits the pump barrel and plunger to wear more evenly, resulting in longer pump life and a more cost efficient pump assembly. The solid impurities that are entrained in the pumped fluid are then flushed away and enter the produced well stream.

When the pump is not operational, the settling solid impurities are redirected into the cup component 14, through the flutes 29 of the cyclone component 12 or the openings 130 of the hollow valve rod coupler component 112 and inward into the interior diameter of the pump plunger. This keeps any concentration of solid impurities from accumulating and wedging between the outer diameter of the plunger and the pump barrel, thereby reducing the possibility of plunger sticking and excessive barrel wear.

Any solids that do pass between the cup component 14 and the interior diameter of the barrel and travel southward will come into contact with the ring component 16. Due to the hardness of the ring component 16, any solid impurities that do come into contact with it will be crushed. When the solid impurities are crushed, the remnants thereof will pass by the plunger without damaging it.

The high density poly-fiber material of the cup component 14 will eventually experience wear as a result of use, and over time will not entrap all solid impurities. Thus, solids that escape past the cup component 14 will then begin to accumulate in the accumulator region 46 of the ring coupler component 18. In this way, the accumulator region 46 of the ring coupler component 18 acts as a secondary containment area to help prevent solid impurities from travelling further southward and into the area of the plunger.

It should be noted that the cup component 14, ring component 16, and seals 70 can all be replaced when they are no longer efficient as a result of wear and use. Replacement of these items on the cyclonic debris evacuation apparatus 10 or 100 can be much more cost efficient overall as opposed to replacing an entire pump plunger system, as would be required with prior art pump plunger systems.

When incorporating the modified ring component 16A of FIGS. 51-59 into the cyclonic debris evacuation apparatus 10, solids can be prevented from passing twice over the cup component 14 to reduce its wear and keep the cup component 14 from premature failure. The removal of the solids can take place on the same upstroke and downstroke described above. On the upstroke, the solids can pass the cup component 14 as it wears and settles atop the ring component 16A. The ring component 16A can have a taper groove that captures the solids keeping them off the barrel which could cause barrel wear.

On the down stroke of the pump, and with the addition of the groove 162 and ports 160 in the ring component 16A, solids can be accumulated away from the barrel wall allowing them to escape inward thru the ports 160 where they can flow into the interior flow section of the main body. The solids can be swept away into the flow keeping the cup component 14, barrel, and plunger from additional wear.

The foregoing description is provided to enable any person skilled in the relevant art to practice the various embodiments described herein. Various modifications to these embodiments will be readily apparent to those skilled in the relevant art, and generic principles defined herein can be applied to other embodiments. Thus, the claims are not intended to be limited to the embodiments shown and described herein, but are to be accorded the full scope consistent with the language of the claims, wherein reference to an element in the singular is not intended to mean "one and only one" unless specifically stated, but rather "one or more." All structural and functional equivalents to the elements of the various embodiments described throughout this disclosure that are known or later come to be known to those of ordinary skill in the relevant art are expressly incorporated herein by reference and intended to be encompassed by the claims. Moreover, nothing disclosed herein is intended to be dedicated to the public regardless of whether such disclosure is explicitly recited in the claims.

What is claimed is:
1. A method for removing a buildup of solid impurities on a barrel using a cyclonic debris evacuation assembly, said method comprising:

creating a positive seal between said barrel and a cup component of said cyclonic debris evacuation assembly by expanding said cup component against an interior diameter of said barrel;

sweeping solid impurities inwardly and away from an inside surface of said barrel to said cup component;

capturing solid impurities that pass beyond said cup component within a groove positioned below said cup component;

directing said solid impurities captured within said groove through at least one port within said groove; and flushing away said solid impurities.

2. The method of claim 1, wherein sweeping solid impurities inwardly to said cup component and capturing said solid impurities that pass beyond said cup component occur on an upstroke of a pump plunger connected to said cyclonic debris evacuation assembly.

3. The method of claim 1, wherein directing said solid impurities captured within said groove occurs on a downstroke of a pump plunger connected to said cyclonic debris evacuation assembly.

4. The method of claim 3, wherein said downstroke causes fluid containing said solid impurities to move by said at least one port creating a vacuum.

5. The method of claim 1, wherein flushing away said solid impurities comprises funneling said impurities into a well stream.

* * * * *